US009723222B2

(12) United States Patent
Oh et al.

(10) Patent No.: US 9,723,222 B2
(45) Date of Patent: Aug. 1, 2017

(54) MOBILE TERMINAL WITH A CAMERA AND METHOD FOR CAPTURING AN IMAGE BY THE MOBILE TERMINAL IN SELF-PHOTOGRAPHY MODE

(71) Applicant: LG ELECTRONICS INC., Seoul (KR)

(72) Inventors: Jinsuk Oh, Seoul (KR); Heekyung Seo, Seoul (KR); Jimyong Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/882,272

(22) Filed: Oct. 13, 2015

(65) Prior Publication Data

US 2016/0119552 A1    Apr. 28, 2016

(30) Foreign Application Priority Data

Oct. 24, 2014    (KR) .......................... 10-2014-0145380

(51) Int. Cl.
*H04N 5/262*    (2006.01)
*G06F 3/0488*    (2013.01)
(Continued)

(52) U.S. Cl.
CPC ......... *H04N 5/2628* (2013.01); *G06F 3/0412* (2013.01); *G06F 3/0416* (2013.01);
(Continued)

(58) Field of Classification Search
CPC ............... H04N 5/2628; H04N 5/2258; H04N 5/23216; H04N 5/23219; H04N 5/23245;
(Continued)

(56) References Cited

U.S. PATENT DOCUMENTS

| 8,749,687 B2 * | 6/2014 | Kang | H04N 5/232 |
| | | | 348/333.01 |
| 2006/0066732 A1 * | 3/2006 | Heymann | H04N 5/232 |
| | | | 348/231.4 |

(Continued)

FOREIGN PATENT DOCUMENTS

| CN | 203574726 | 4/2014 |
| EP | 1843563 | 10/2007 |
| KR | 10-2015-0131815 | 11/2015 |

OTHER PUBLICATIONS

European Patent Office Application Serial No. 15189470.6, Search Report dated Mar. 1, 2016, 11 pages.

*Primary Examiner* — Antoinette Spinks
(74) *Attorney, Agent, or Firm* — Lee, Hong, Degerman, Kang & Waimey

(57) ABSTRACT

A mobile terminal and controlling method thereof are disclosed, by which self-photography can be assisted in a manner of controlling a front camera and a rear camera. The mobile terminal includes a first camera located on a rear side of the mobile terminal, a touchscreen and a controller. The controller is configured to activate the first camera, cause the touchscreen to display a preview screen for the activated first camera, and cause the touchscreen to stop the displaying of the preview screen when a self-photograph condition is satisfied while the first camera is activated and the preview screen is displayed, wherein the first camera is used to capture a first image in a self-photography mode when the self-photograph condition is satisfied.

20 Claims, 21 Drawing Sheets

(51) Int. Cl.
*H04M 1/725* (2006.01)
*H04N 5/232* (2006.01)
*G06F 3/041* (2006.01)
*H04N 7/14* (2006.01)
*H04N 5/225* (2006.01)

(52) U.S. Cl.
CPC ...... *G06F 3/0488* (2013.01); *H04M 1/72522* (2013.01); *H04N 5/2258* (2013.01); *H04N 5/23216* (2013.01); *H04N 5/23219* (2013.01); *H04N 5/23245* (2013.01); *H04N 5/23293* (2013.01); *H04N 7/142* (2013.01); *H04M 2250/12* (2013.01); *H04M 2250/22* (2013.01); *H04M 2250/52* (2013.01); *H04N 2007/145* (2013.01)

(58) Field of Classification Search
CPC . H04N 5/23293; G06F 3/0412; G06F 3/0416; G06F 3/0488
USPC ............. 348/333.01, 333.02, 333.03, 333.05
See application file for complete search history.

(56) References Cited

U.S. PATENT DOCUMENTS

| | | |
|---|---|---|
| 2009/0082066 A1 | 3/2009 | Katz |
| 2010/0225773 A1 | 9/2010 | Lee |
| 2011/0128401 A1 | 6/2011 | Choi et al. |
| 2011/0317031 A1* | 12/2011 | Honda ............... H04N 5/23219 348/229.1 |
| 2013/0021491 A1* | 1/2013 | Lee ....................... H04N 19/56 348/222.1 |
| 2013/0065614 A1 | 3/2013 | Jung |
| 2014/0063313 A1* | 3/2014 | Choi .................. H04N 5/23216 348/333.02 |
| 2015/0055003 A1 | 2/2015 | Chen et al. |
| 2016/0191790 A1* | 6/2016 | Wang ................ H04N 5/23216 348/333.01 |

* cited by examiner

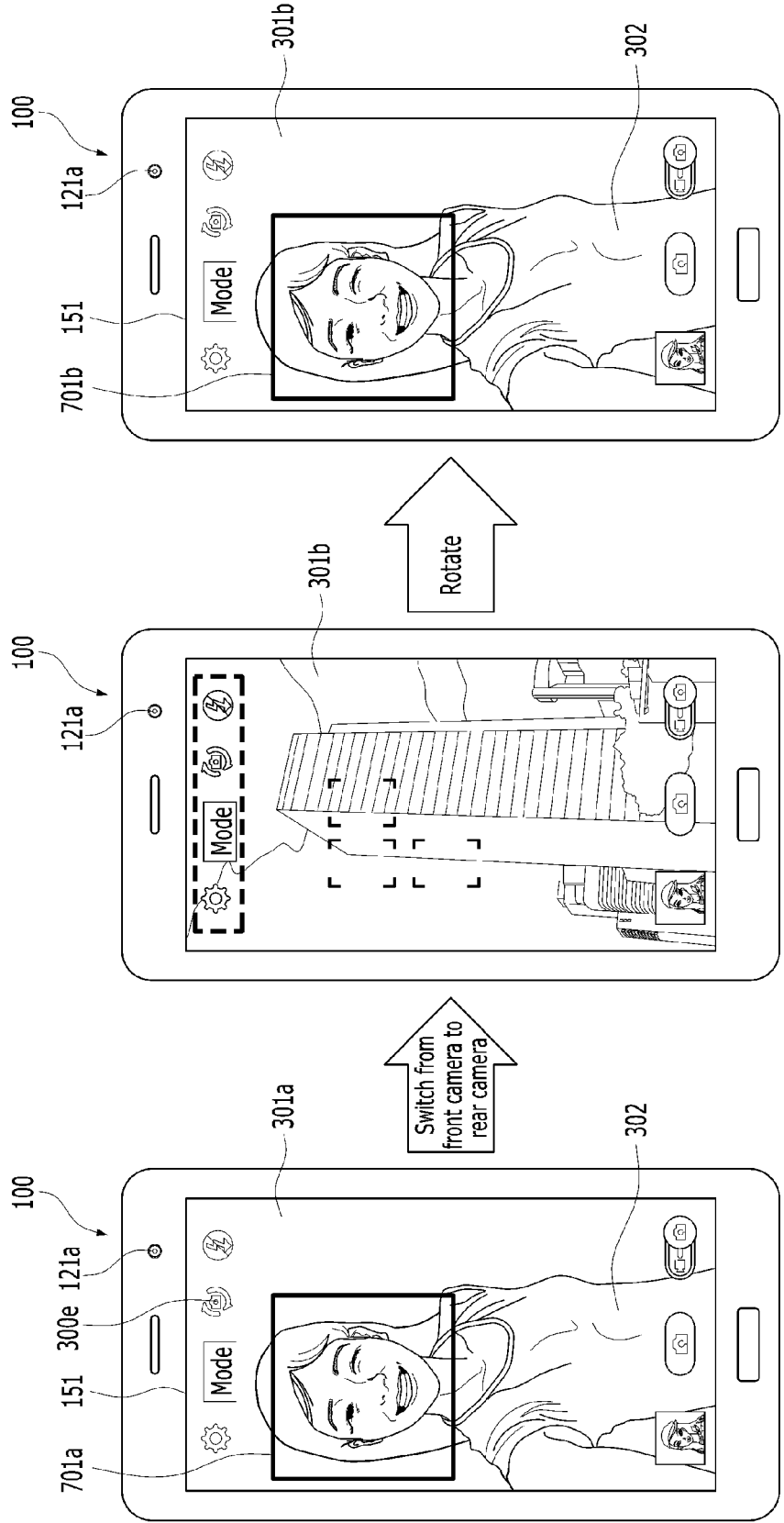

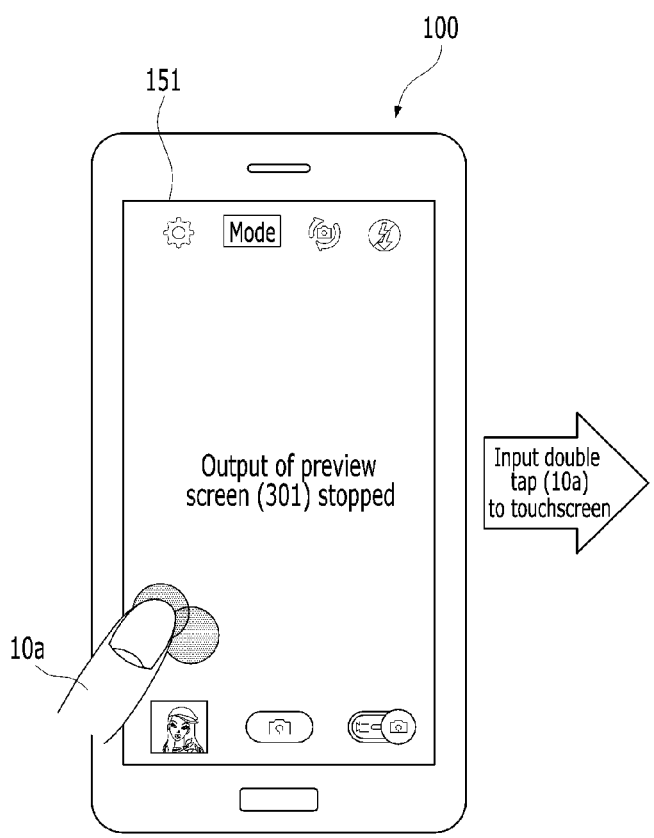 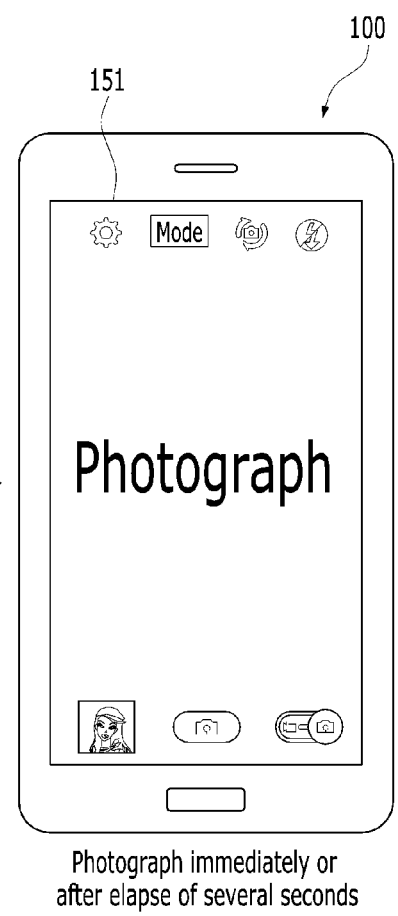
FIG. 9A
FIG. 9B

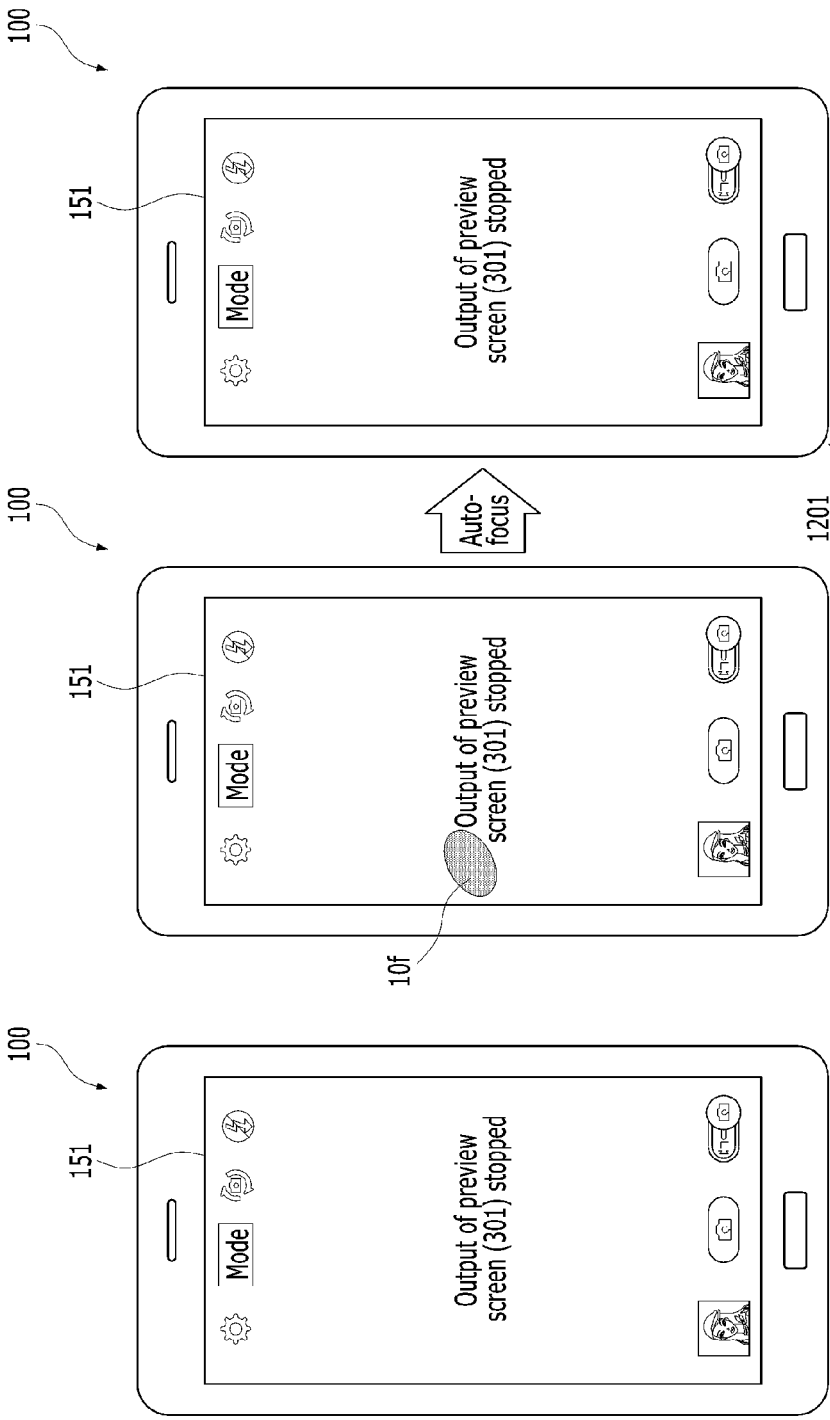

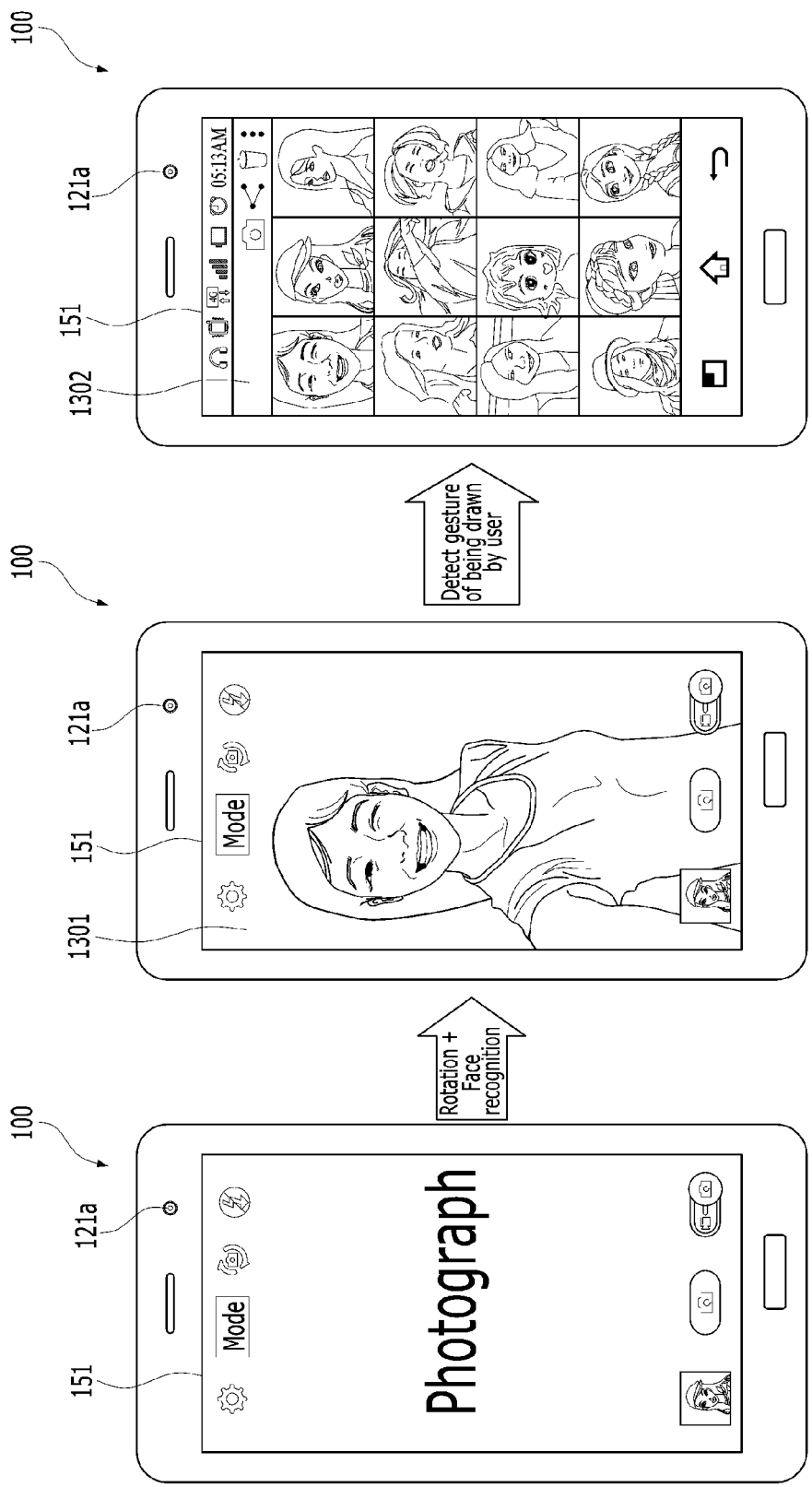

Display non-recommend
indicators (1401-1) and (1401-2)

Delete non-recommended
item in case of selecting
a delete button (1402)

Non-recommended item
deleted thumbnail list

Check thumbnail list

Re-enter self-photography mode

Display preview screen of taken photo

Detect a gesture of lowering a mobile terminal in a left or right direction and then lifting up the lowered mobile terminal Re-enter self-photography mode after photo deletion

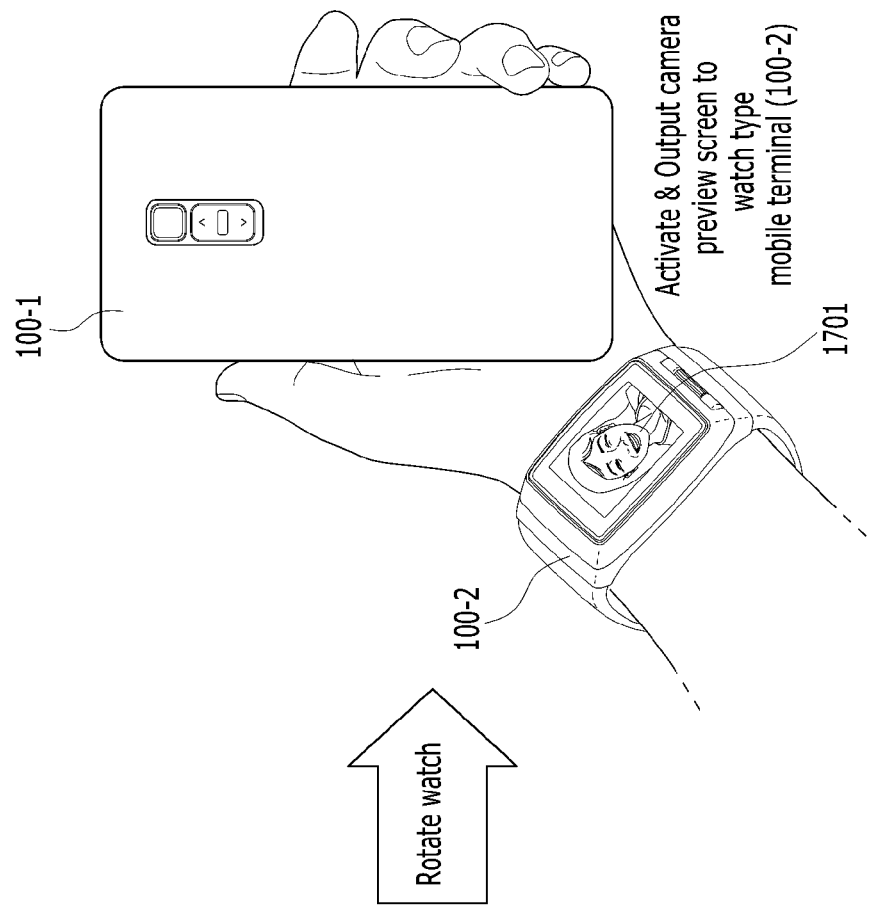
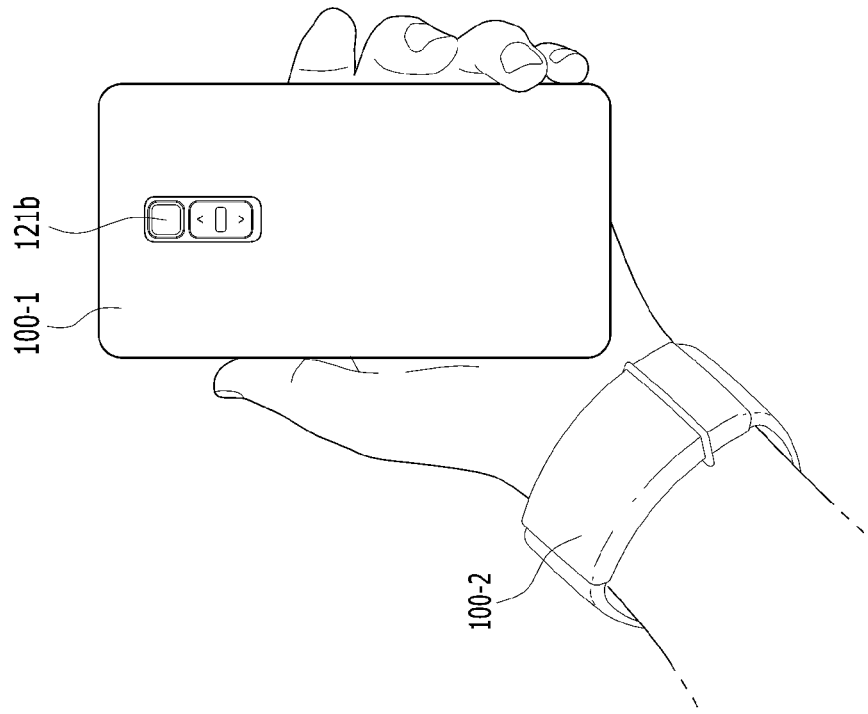

1. Zoom In

Touch and move finger clockwise

2. Zoom Out

Touch and move finger counterclockwise

3. Shot once

Tap on touchscreen (1701)

4. Burst Shoot

Double tap on touchscreen (1701)

5. Photograph after 5 seconds

Long touch touchscreen (1701)

6. Timer cancel

Touch screen before elapse of 5 seconds

MOBILE TERMINAL WITH A CAMERA AND METHOD FOR CAPTURING AN IMAGE BY THE MOBILE TERMINAL IN SELF-PHOTOGRAPHY MODE

CROSS-REFERENCE TO RELATED APPLICATIONS

Pursuant to 35 U.S.C. §119(a), this application claims the benefit of earlier filing date and right of priority to Korean Application No. 10-2014-0145380, filed on Oct. 24, 2014, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating the use of a terminal in further consideration of user's convenience.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, functions of a mobile terminal tend to be diversified. For instance, the diversified functions include a function of data and audio communication, a function of photographing and recording a video through a camera, a function of audio recording, a function of music file play through a speaker system, a function of outputting image or video through a display unit, and the like. A prescribed terminal is further equipped with an electronic game play function or performs a multimedia player function. Particularly, a recent mobile terminal is able to receive multicast signals for providing visual contents such as a broadcast, a video, a television program and the like.

As functions of the terminal are getting diversified, the terminal tends to be implemented as a multimedia player provided with complex functions such as photographing of photos or videos, playback of music or video files, game play, broadcast reception and the like for example.

To support and increase the terminal functions, it may be able to consider the improvement of structural parts and/or software parts of the terminal.

Particularly, the use of a mobile terminal such as a smartphone is getting closer to daily life of a user of the mobile terminal. Namely, smartphone users take photos of daily lives of their own through cameras and tend to share the photos with other users via SNS (social network service) and the like. Thus, since the photographing through camera is increasingly utilized, it is necessary to make many efforts to research and develop a control method of facilitating photography.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which a self-photography intention is accurately determined to control the mobile terminal in accordance with the determined photography intention.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment the present invention may include a rear camera located on a rear surface of the mobile terminal, a touchscreen, and a controller, if the rear camera is activated, controlling the touchscreen to output a preview screen for the activated rear camera, the controller, if a self-photography condition is satisfied in the course of outputting the preview screen, controlling an output of the preview screen to be stopped.

In another aspect of the present invention, a method of controlling a mobile terminal having a rear camera located on a rear surface of the mobile terminal according to another embodiment of the present invention may include the steps of if the rear camera is activated, outputting a preview screen for the activated rear camera and if a self-photography condition is satisfied in the course of outputting the preview screen, controlling an output off the preview screen to be stopped.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 7A, FIG. 7B, and FIG. 7C are diagrams for one example of a self-photography condition according to one embodiment of the present invention;

FIG. 9A and FIG. 9B are diagrams for configuration of a method of controlling a photography based on a touch gesture applied to a touchscreen 151 according to one embodiment of the present invention;

FIG. 12A, FIG. 12B, and FIG. 12C are diagrams for a control method of controlling a focus in self-photography mode according to one embodiment of the present invention;

FIG. 13A, FIG. 13B, and FIG. 13C are diagrams for a control method of checking a taken photo after taking a photo in self-photography mode according to one embodiment of the present invention;

FIG. 17A and FIG. 17B are diagrams for a control method of checking a preview screen 1701 of a rear camera 121b through a touchscreen 1701 of a watch type mobile terminal 100-2 according to one embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
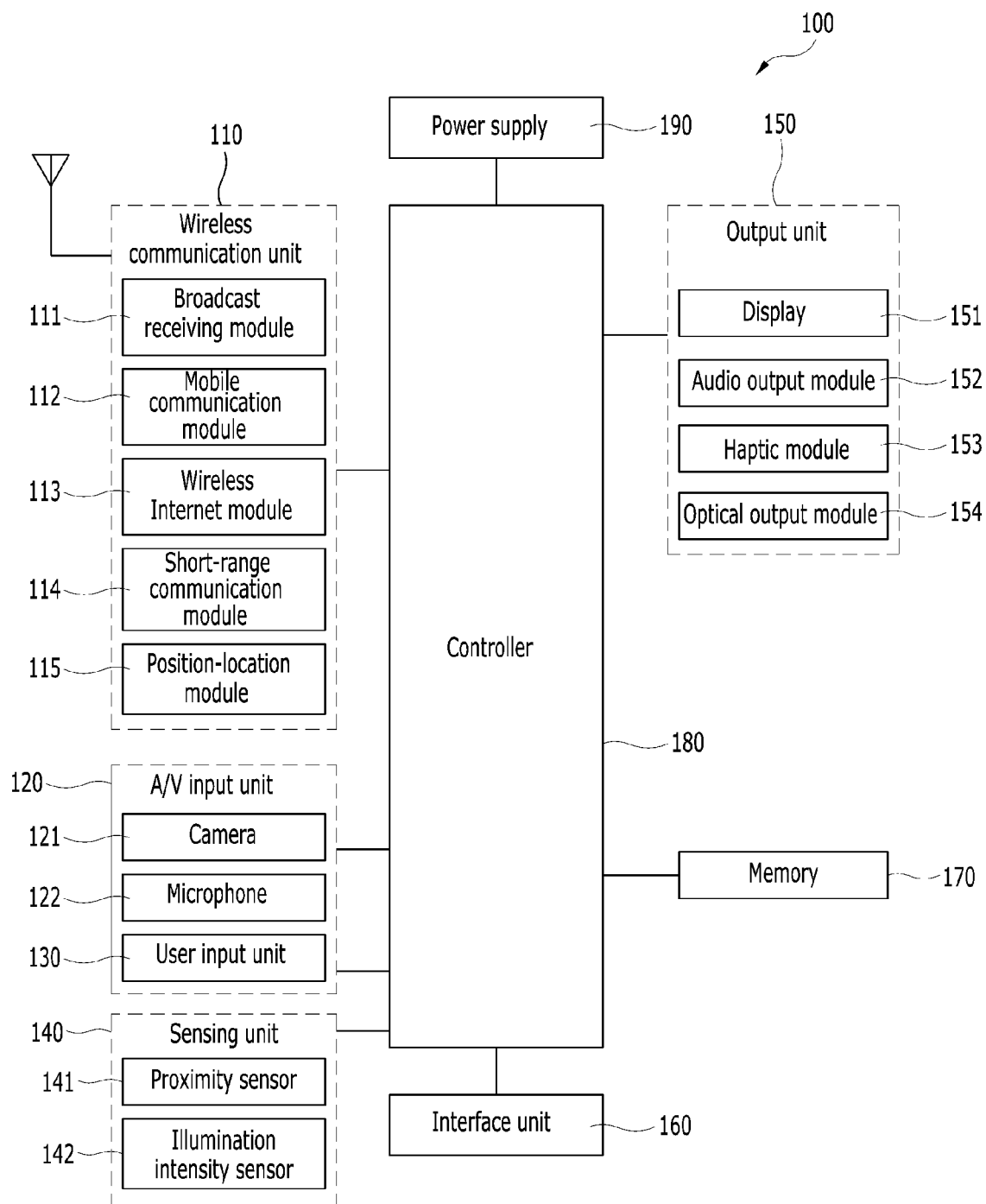
FIG. 1A is a block diagram of a mobile terminal in accordance with the present disclosure.
Figure 1B:
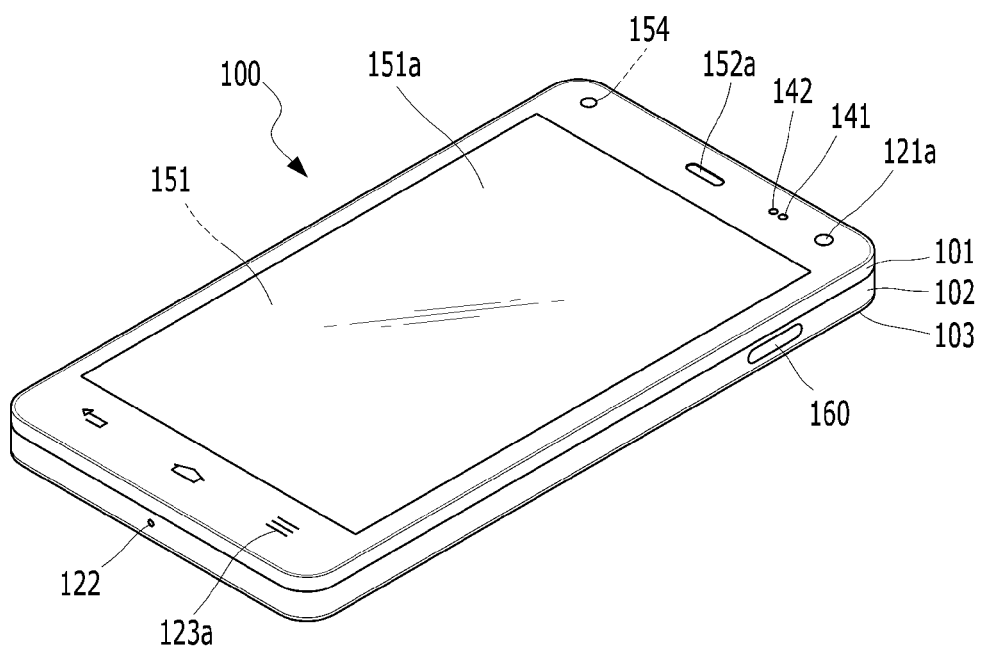
FIG. 1B and FIG. 1C are conceptual views of one example of the mobile terminal, viewed from different directions.
Figure 1C:
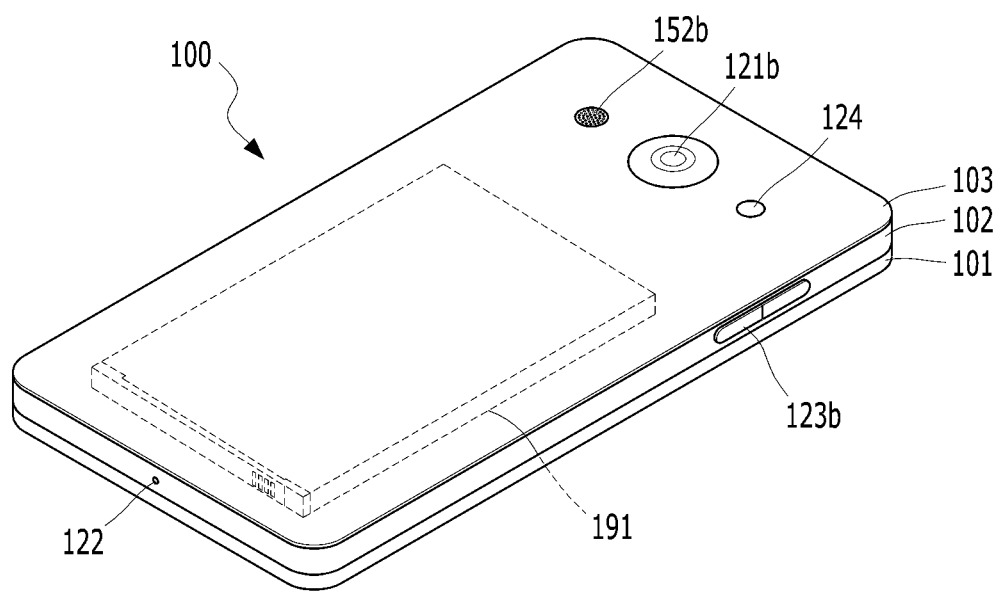

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the mobile terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIG. 1B and FIG. 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

As mentioned in the foregoing description with reference to FIG. 1B and FIG. 1C, a terminal may include a plurality of cameras provided to a body. In the following detailed description and drawings, the $1^{st}$ camera 121a located at a front surface of the terminal shall be named a front camera 121a and the $2^{nd}$ camera 121b located at a rear surface of the terminal shall be named a rear camera 121b.

When photography is performed using the front camera 121a and the rear camera 121b, a user can approximately predict a photography result by referring to a preview screen outputted through the touchscreen 151. In general, considering that a location of the touchscreen 151 is a front surface of the body of the terminal, the front camera 121a is mainly used for photography in a user direction but the rear camera 121b is mainly used for photography in a direction opposite to a user. Photography performed in a user direction may be frequently used to take a photo including a user, which is so-called selfie or self-camera.

Yet, due to a problem of an internal structure of the terminal, the front camera 121a and the rear camera 121b have differences in supportive performance (e.g., resolution), functions (e.g., slow motion function, etc.) and the like. Generally, the rear camera 121b may have performance better than that of the rear camera 121a and may be also equipped with functions more than those of the front camera 121a.

Recently, as a user tends to take a photo of herself/himself more frequently, utilization of the front camera 121a tends to increase as well. Yet, the front camera 121a fails to have performance or functionality better than that of the rear camera 121b.

Therefore, according to one embodiment of the present invention, it is intended to provide a control method of photographing a user conveniently using the rear camera 121b having relatively better performance and functionality. Particularly, when photography is performed using the rear camera 121b, it is inconvenient for the user to watch a preview screen through the touchscreen 151. Hence, the present invention provides a control method for compensating such inconvenience.

Figure 2:
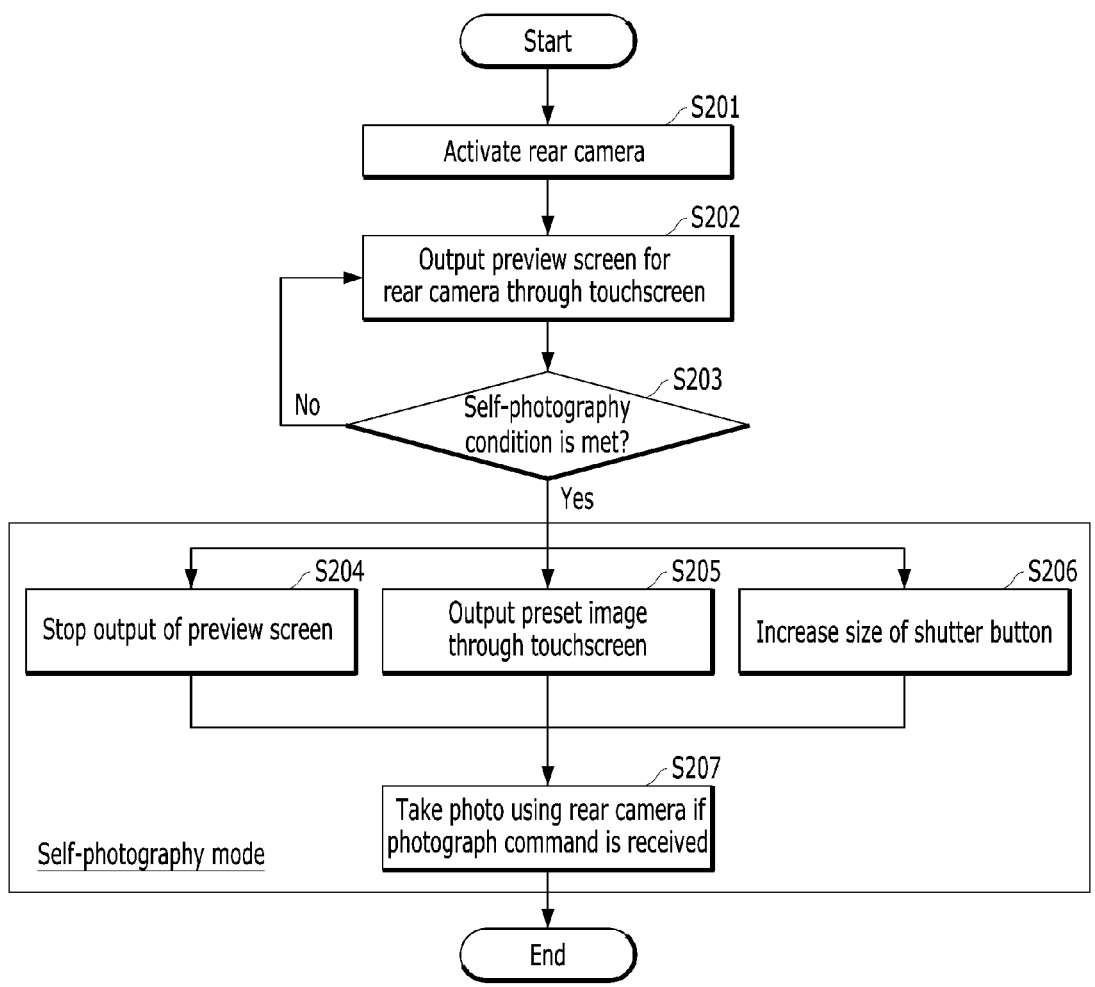
FIG. 2 is a flowchart for a control method in a self-photography mode by entering the self-photography mode according to one embodiment of the present invention.

FIG. 2 is a flowchart for a control method in a self-photography mode by entering the self-photography mode according to one embodiment of the present invention. And, FIG. 3 is a diagram of configuration in photography mode according to one embodiment of the present invention. Steps S201 to S203 shown in FIG. 2 are described in detail with reference to FIG. 3 as follows.

First of all, FIG. 2 is a flowchart in a state of entering a photography mode using the camera 121. In the step S201, the controller 180 activates the rear camera 121b. In the step S202, the controller 180 can output a preview screen 301 for the rear camera 121b through the touchscreen 151.

Figure 3A:
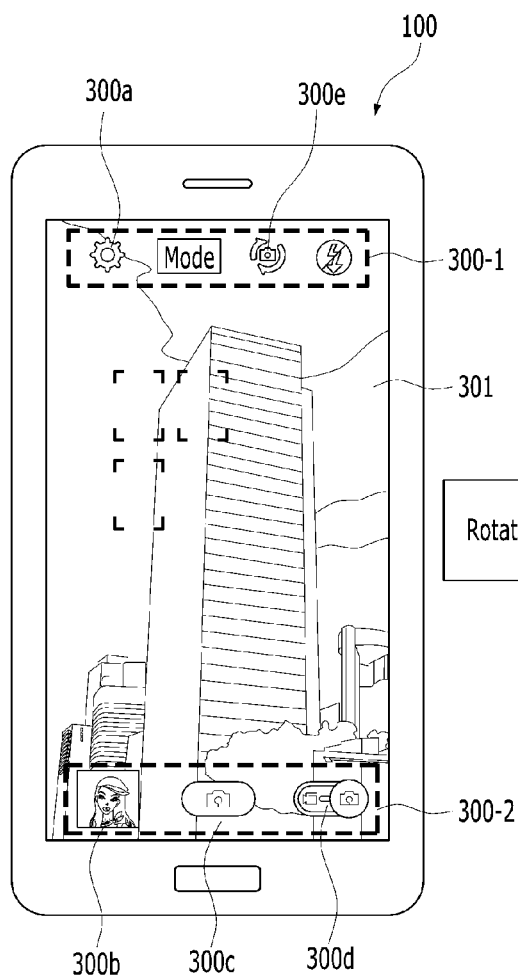
FIG. 3A and FIG. 3B are diagrams of configuration in photography mode according to one embodiment of the present invention.

FIG. 3A is a diagram for configuration of photography using the mobile terminal 100 having entered the photography mode. In this case, the photography mode may include a photo photography mode for photographing a still photo or burst shots and a videography mode for making a video. The controller 180 currently displays a preview screen 301 of an image received through the activated rear camera 121b. According to one embodiment of the present invention, the preview screen 301 may mean a screen provided to enable a user to predict a photography result before performing photography. If a photography direction of the rear camera 121b fails to face a user 302, as shown in FIG. 3A, the user 302 may not appear on the preview screen 301.

Referring to FIG. 3A, the photography configuration diagram may include a setting button region 300-1 and a control button region 300-2. The setting button region 300-1 may include an environment control button 330a for setting a photography environment and a plurality of buttons including a camera switch button 300e. The control button region 300-2 may include at least one of a quick view button 300b, a shutter button 300c and photo/video mode switch button 300d. The quick view button 300b is the button for reading a recently taken photo. In response to an input of touching the quick view button 300b, the controller 180 can output a most recently taken photo. The shutter button 300c is the button for taking a photo in the photo mode or starting/ending a video recording in the video mode. The photo/video photography mode switch button 300d is the button for switching a photo photography mode and a videography mode to each other. The camera switch button 300e is the button for switching the front camera 121a and the rear camera 121b to each other.

In a step S203, the controller 180 determines whether a self-photography condition is satisfied. If the self-photography condition is satisfied, the controller 180 can enter a self-photography mode corresponding to steps S204 to S207. If the self-photography condition is not satisfied, the controller 180 can go back to the step S202 (Maintaining an existing photography mode). The self-photography (so-called self-camera or selfie) means that a user takes a photo including the user herself/himself using the front camera 121a or the rear camera 121b. The self-photography condition means the condition for determining whether a user performs self-photography and may include conditions for various signals received through at least one of the sensing unit 140, the touchscreen 151, the front camera 121a and the rear camera 121b. Details of the conditions shall be described in detail later with reference to the accompanying drawings.

According to one embodiment of the present invention, if the self-photography condition is satisfied, it is proposed to enter the self-photography mode (steps S204 to S207). The self-photography mode means a state of if self-photography is determined as performed, providing a control method appropriate for the self-photography.

Figure 3B:
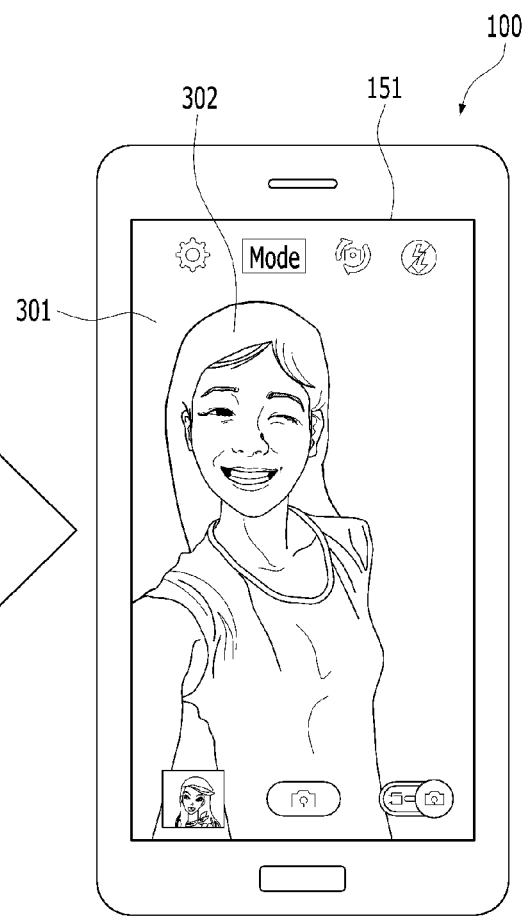

Referring to FIG. 3B, the rear camera 121b currently faces toward the user 302. And, the user 302 will be included in a preview screen 301 for the rear camera 121b. As mentioned in the foregoing description with reference to FIG. 1B and FIG. 1C, since the rear camera 121b is disposed on a backside of the mobile terminal 100, the user 302 may be unable to check the preview screen 301.

Therefore, according to one embodiment of the present invention, it is proposed to automatically stop an unnecessary output of the preview screen 301. The reason for this is that the user 302 may not want to show an action of the self-photography to other persons. One example of a configuration diagram is described in detail with reference to FIG. 4A and FIG. 4B as follows.

Figure 4A:
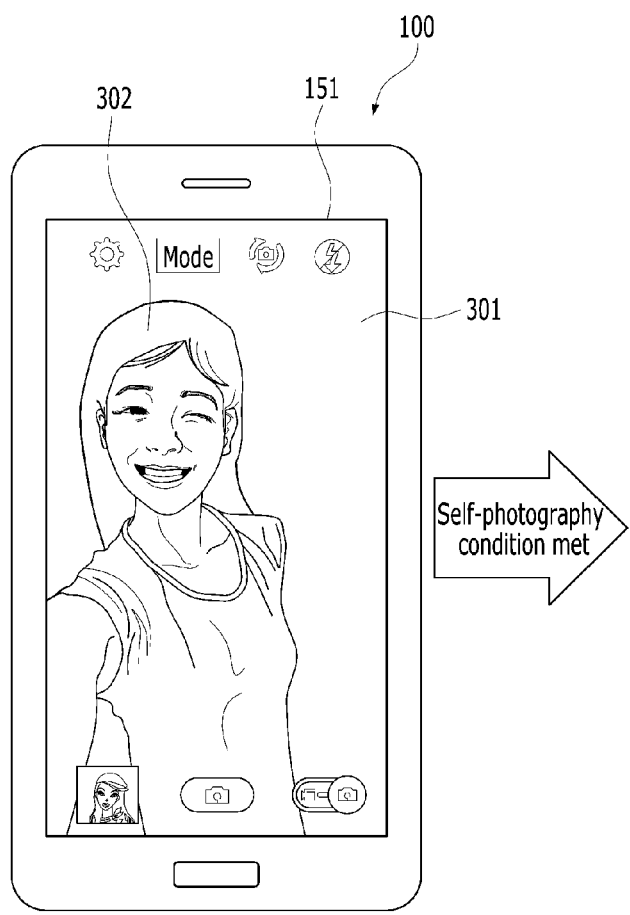
FIG. 4A and FIG. 4B are diagrams for a control method of interrupting an output of a preview screen 301 in case of entering a self-photography mode according to one embodiment of the present invention.
Figure 4B:
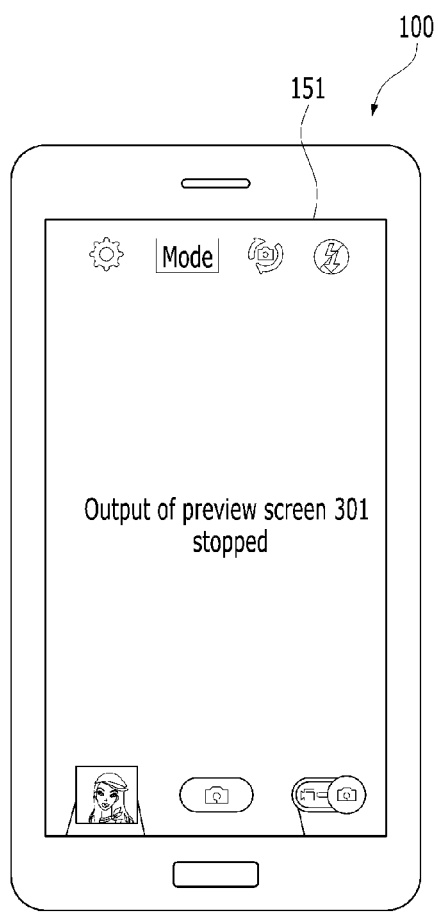

FIG. 4A and FIG. 4B are diagrams for a control method of interrupting an output of a preview screen 301 in case of entering a self-photography mode according to one embodiment of the present invention.

As mentioned in the foregoing description, in case of performing self-photography through the rear camera 121b, the user 302 is unable to check the preview screen 301 substantially for herself. Therefore, according to one embodiment of the present invention, it is proposed to interrupt the output of the preview screen 301.

Referring to FIG. 4A, as mentioned in the foregoing description, a preview screen 301 through the rear camera 121b is currently outputted. In doing so, if a self-photography condition is satisfied, referring to FIG. 4B, the controller 180 may stop displaying the preview screen 301.

Moreover, it may be able to display a preset image instead of displaying the preview screen 301. Such an embodiment is described in detail with reference to FIG. 5A, FIG. 5B as follows.

Figure 5A:
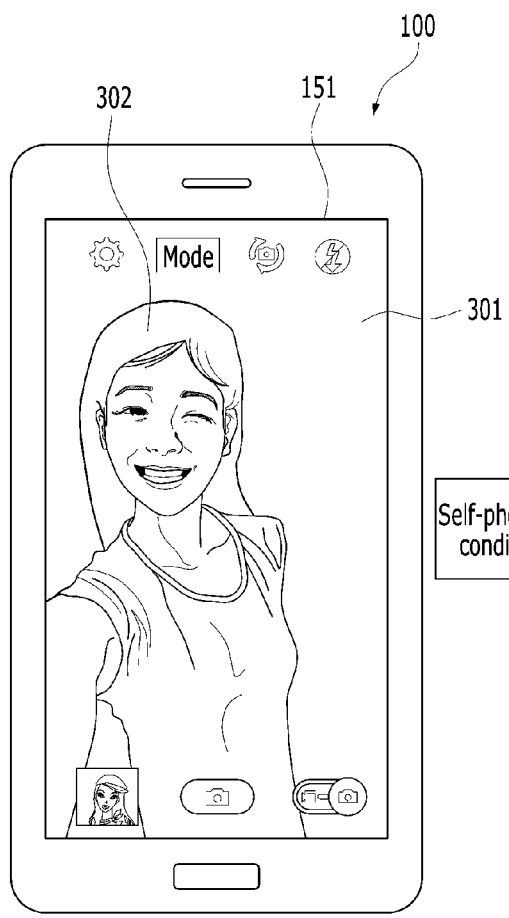
FIG. 5A and FIG. 5B are diagrams for a control method of outputting a preset image instead of a preview screen 301 in case of entering a self-photography mode according to one embodiment of the present invention.
Figure 5B:
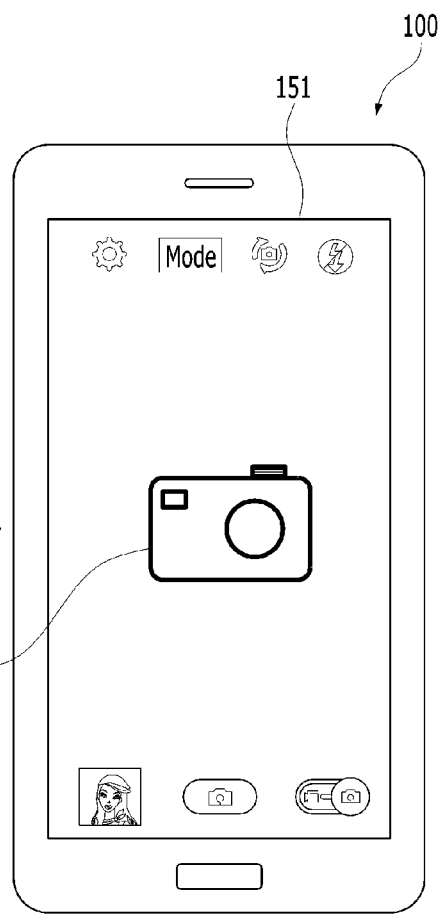

FIG. 5A, FIG. 5B are diagrams for a control method of outputting a preset image instead of a preview screen 301 in case of entering a self-photography mode according to one embodiment of the present invention.

Referring to FIG. 5A, likewise, as mentioned in the foregoing description, a preview screen 301 through the rear camera 121b is currently outputted. In doing so, if a self-photography condition is satisfied, referring to FIG. 5B, the controller 180 can display a preset image 501 instead of outputting the preview screen 301.

While the user 302 performs the self-photography, the preset image 501 may be shown to another person located in a direction faced by the touchscreen 151. Hence, the preset image 501 may include an image indicating that a photo is currently taken by the user 302.

Meanwhile, when the user 302 performs the self-photography, since the user 302 is unable to check the shutter button 300c displayed on the touchscreen 151, it may be difficult for the user 302 to manipulate the shutter button 300c. Therefore, according to one embodiment of the present invention, it is proposed to increase a size of the shutter button 300c on entering a self-photography mode.

Figure 6A:
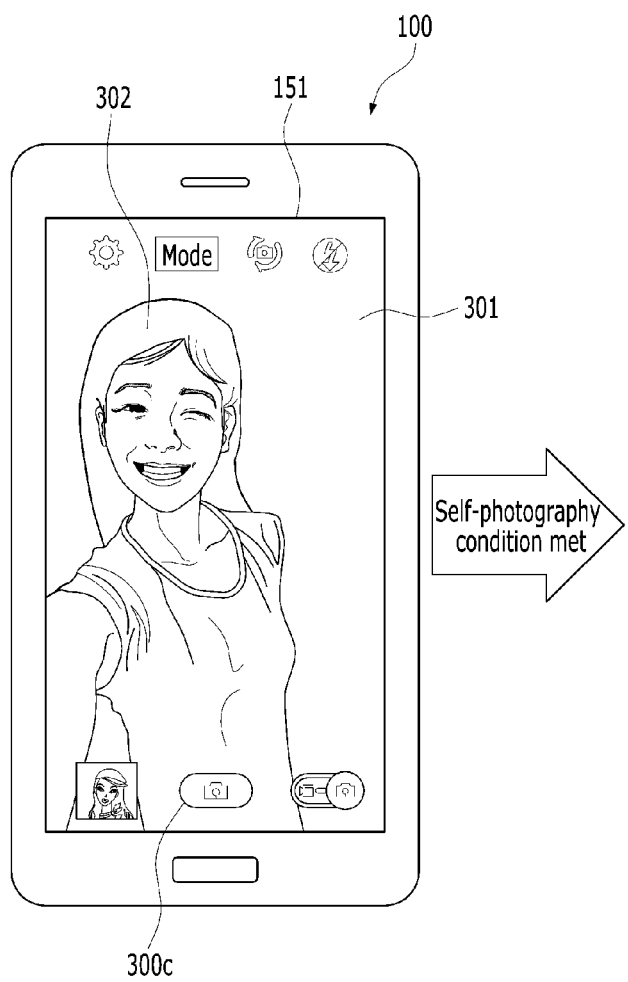
FIG. 6A and FIG. 6B are diagrams for a control method of increasing a size of a shutter button included in a preview screen 301 in case of entering a self-photography mode according to one embodiment of the present invention.
Figure 6B:
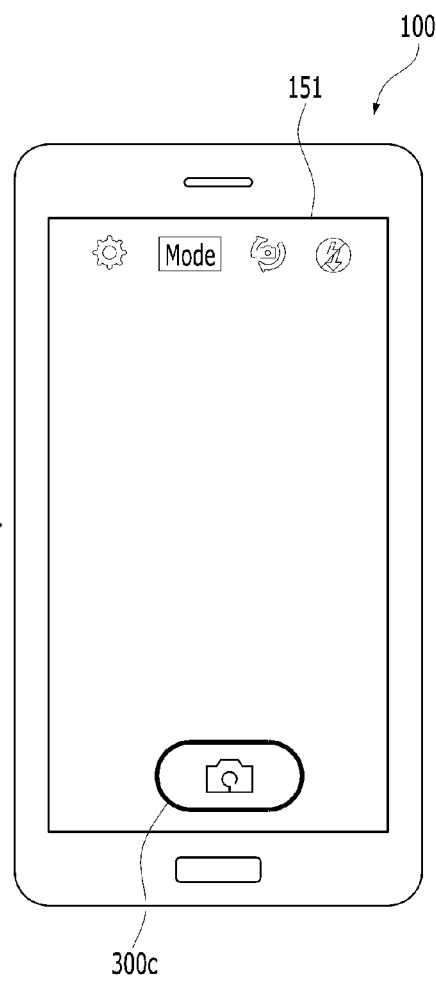

FIG. 6A, FIG. 6B are diagrams for a control method of increasing a size of a shutter button included in a preview screen 301 in case of entering a self-photography mode according to one embodiment of the present invention.

Referring to FIG. 6A, likewise, as mentioned in the foregoing description, a preview screen 301 through the rear camera 121b is currently outputted. And, a shutter button 300c can be outputted through a prescribed region of the preview screen 301 to take a photo.

In doing so, if a self-photography condition is satisfied, referring to FIG. 6B, the controller 180 can control the touchscreen 151 to increase a size of the shutter button 300c.

In particular, since a user has to manipulate the shutter button 300c while looking at a backside of the mobile terminal 100 (e.g., the user needs to take a photo by touching the shutter button 300c), if a size of the shutter button 300c is equal or similar to an existing size of the shutter button 300c, it may be difficult for the user to manipulate the shutter button 300c accurately.

According to the above-described embodiment of the present invention, the user can control the photography with ease using the enlarged shutter button 300c.

According to another embodiment of the present invention, it is proposed to take a photo using the touchscreen 151 entirely (or in part) instead of increasing the size of the shutter button 300c only. In particular, when the touchscreen is entirely used as a shutter button, if a touch is applied to any point on the touchscreen 151, it is able to control a photo to be taken through the camera 121. Meanwhile, the touchscreen 151 may be unintentionally touched depending on how a user grabs the mobile terminal 100.

If so, since a photograph command may be recognized incorrectly, the demand for a control method of preventing such an incorrect recognition may rise. In the following description, a control method of preventing such an incorrect recognition shall be described with reference to FIG. 9A-FIG. 11C later.

Referring now to FIG. 2, in a step S207, if a photograph command is received, the controller 180 takes a photo using the rear camera 121b and is then able to save image data of the taken photo in the memory 170.

The step S203 shown in FIG. 2 has been described on the self-photography condition. One example of the self-photography condition is described in detail with reference to FIG. 7A-FIG. 7C and FIG. 8A, FIG. 8B as follows.

FIG. 7A-FIG. 7C are diagrams for one example of a self-photography condition according to one embodiment of the present invention.

According to one embodiment of the present invention described with reference to FIG. 7A-FIG. 7C, photography is performed through the front camera 121a. In doing so, as the front camera 121a is switched to the rear camera 121b, if a rotation of the mobile terminal 100 is detected, the photography is determined as self-photography.

Referring to FIG. 7A, the controller 180 outputs a front preview screen 301a for the front camera 121a. If a user 302 poses in a direction faced by the front camera 121a, an appearance of the user 302 may be included in the front preview screen 301a.

If a camera switch button 300e is selected, referring to FIG. 7B, the controller 180 can output a rear preview screen 301b for the rear camera 121b. If the front preview screen 301a is switched to the rear preview screen 301b, the controller 180 may deactivate the front camera 121a but may maintain the activated state of the front camera 121a. If the user 302 is located in a photographing direction of the front camera 121a, as shown in the drawing, the user 302 may not be included in the rear preview screen 301b.

As the mobile terminal 100 is rotated, if a photographing direction of the rear camera 121b faces the user 302, referring to FIG. 7C, an appearance of the user 302 may be included in the rear preview screen 301b.

In particular, FIG. 7A-FIG. 7C show a situation that the user intends to photograph herself using the rear camera 121b. By detecting such a situation, according to one embodiment of the present invention, it is proposed to enter a self-photography mode.

Therefore, the self-photography condition described with reference to FIG. 7A-FIG. 7C may include at least one of the 3 conditions in the following. According to a $1^{st}$ condition, while photography is performed through the front camera 121a, the front camera 121a is switched to the rear camera 121b (Condition of selecting the camera switch button 300e). According to a $2^{nd}$ condition, a face 701a detected through the front camera 121a is identical to a face 701b detected through the rear camera 121b.

According to a $3^{rd}$ condition, the mobile terminal 100 is rotated over a prescribed angle. In this case, the controller 180 may be able to determine whether the mobile terminal 100 is rotated using a result of detection through the sensing unit 140.

According to another embodiment of the present invention, after the mobile terminal 100 has stored a face of a user 302 in advance, if the face of the user is detected through the rear camera 121b, the controller 180 can enter a self-photography mode. In particular, a self-photography condition for this case includes a condition that a face identical to a previously saved face is detected through the rear camera 121b.

Moreover, as a simplest method, it may be able to enter a self-photography mode in response to a user's entry command.

Figure 8A:
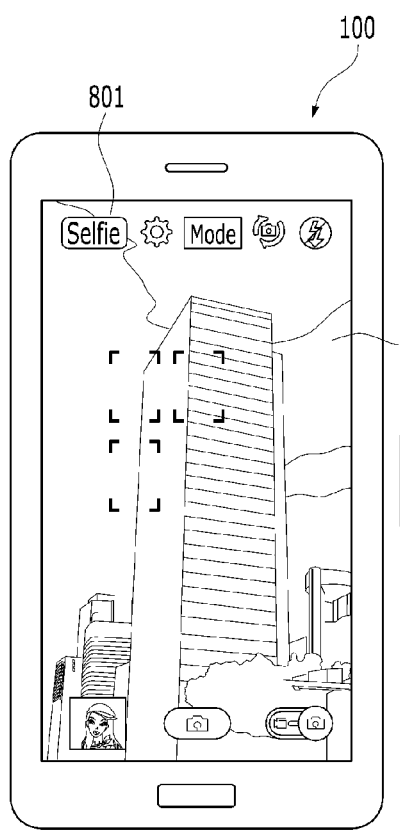
FIG. 8A and FIG. 8B are diagrams for a control method of entering a self-photography mode based on a user's touch input according to one embodiment of the present invention.
Figure 8B:
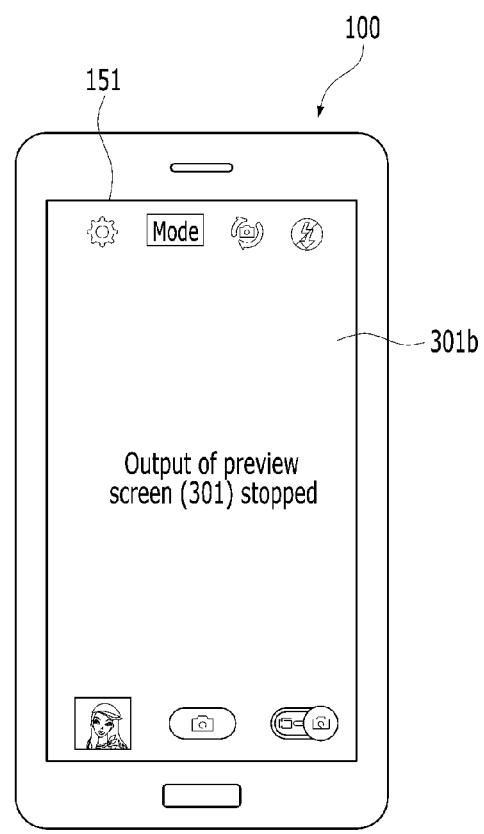

FIG. 8A, FIG. 8B are diagrams for a control method of entering a self-photography mode based on a user's touch input according to one embodiment of the present invention.

Referring to FIG. 8A, the controller 180 outputs a preview screen 301b for an image received through the rear camera 121*b* and also outputs a self-photography button 801 for entering a self-photography mode.

If the self-photography button 801 is selected, referring to FIG. 8B, the controller 180 can enter a self-photography mode (cf., an output of the preview screen 301 is interrupted in the self-photography mode).

Meanwhile, according to the aforementioned embodiment, the control method of controlling photography using an entire area of the touchscreen 151 is described. Thus, if a photography command is received through the entire area, the photography command from a user may be possibly recognized incorrectly. Hence, a control method for preventing such an incorrect recognition is described in detail with reference to FIG. 9A, FIG. 9B as follows.

FIG. 9A, FIG. 9B are diagrams for configuration of a method of controlling a photography based on a touch gesture applied to a touchscreen 151 according to one embodiment of the present invention.

Referring to FIG. 9A, a state of entering a self-photography mode is illustrated. After the self-photography mode has been entered, the controller 180 can perform photography in response to a prescribed touch gesture (e.g., a double tap touch 10*a* shown in the drawing) received through the touchscreen 151.

If the double tap touch 10*a* is received (FIG. 9A), referring to FIG. 9B, the controller 180 can control the rear camera 121*b* to take a photo.

Meanwhile, according to one embodiment of the present invention, a photo can be taken directly or in a prescribed time interval, in response to the prescribed touch gesture. The reason for this is that when a touch gesture is inputted, the mobile 100 may be shaken.

If the prescribed touch gesture is received in FIG. 9A, the controller 180 can control the rear camera 121*b* to take a photo after an elapse of a prescribed time from a timing point of the reception. In doing so, the controller 180 may output a count sound (e.g., '3, 2, 1, and shoot') to guide a photograph timing point between a timing point of the reception of the prescribed touch gesture and a timing point of taking the photo.

As mentioned in the foregoing description of the embodiment, if a photo is taken in response to a touch gesture received through the touchscreen 151, it may be able to avoid recognizing a photograph command incorrectly despite using the entire area of the touchscreen 151.

Meanwhile, as mentioned in the foregoing description, as shown in FIG. 9B if a photography is performed after an elapse of a prescribed time from a timing point of detection of a touch gesture, it may be difficult to guide a user to an accurate photography timing point. Therefore, according to one embodiment of the present invention, it is proposed to further provide a light emitting unit to a rear surface of the mobile terminal 100 in order to guide the photography timing point.

Figures 10A, 10B:
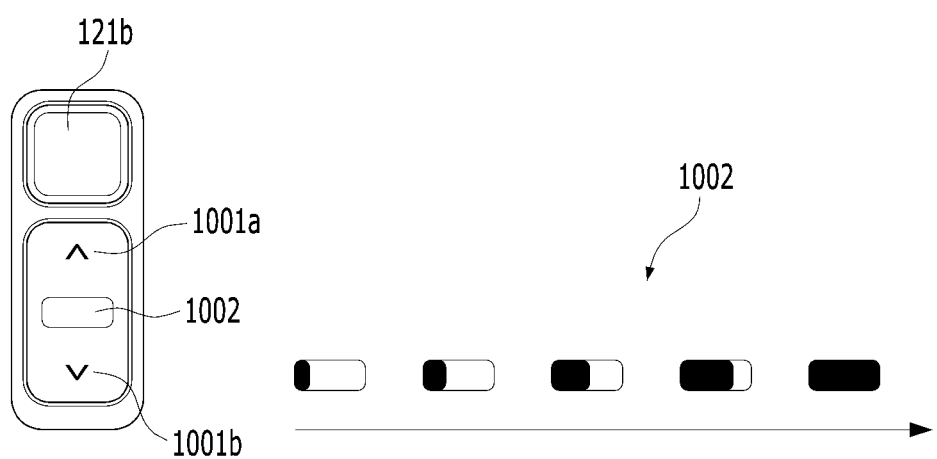
FIG. 10A and FIG. 10B are diagrams for one example of a light emitting unit for guiding a photography timing point according to one embodiment of the present invention.

FIG. 10A and FIG. 10B are diagrams for one example of a light emitting unit for guiding a photography timing point according to one embodiment of the present invention. In particular, FIG. 10A shows a button region possibly disposed on a rear surface of the mobile terminal 100. Referring to FIG. 10A, the button region may include a rear camera 121*b*, a top button 1001*a*, a bottom button 1001*b* and a power button 1002.

According to the example shown in FIG. 10A and FIG. 10B, it is proposed to provide the light emitting unit within the power button 1002. FIG. 10B shows a progress that the light emitting unit provided within the power button 1002 changes with the elapse of time. The changing progress may include a progress starting from a timing point of a reception of a photograph command until actually taking a photo. Hence, a user may be able to estimate a photography timing point by observing the changing progress of the light emitting unit.

Another example of preventing a photograph command from being recognized incorrectly is described in detail with reference to FIG. 11A-FIG. 11C as follows.

Figure 11A:
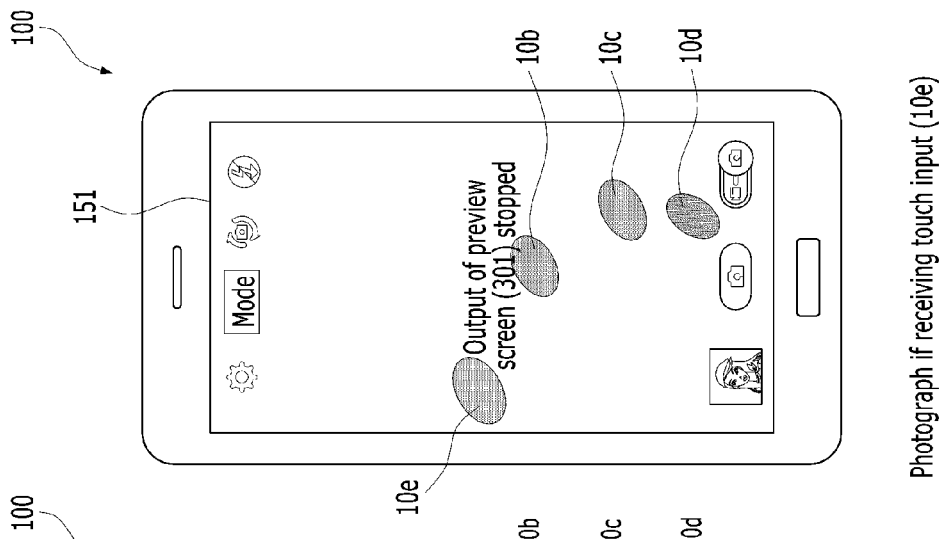
FIG. 11A, FIG. 11B, and FIG. 11C are diagrams for a control method of preventing an incorrect recognition in case of receiving a photography command using a front surface of a touchscreen 151 according to one embodiment of the present invention.
Figure 11B:
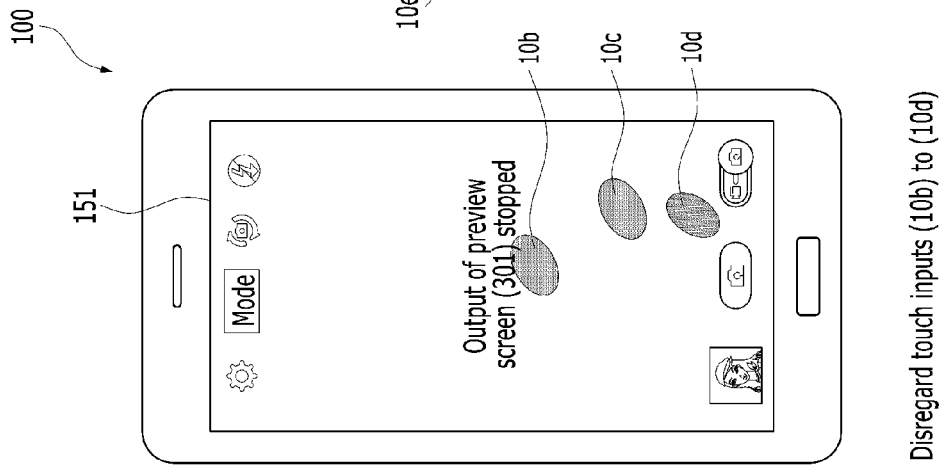
Figure 11C:
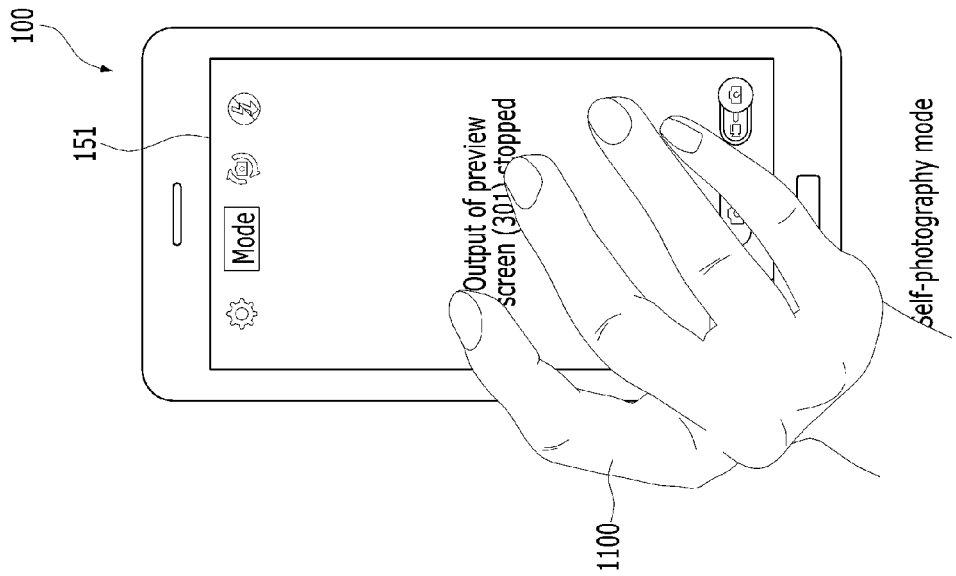

FIG. 11A-FIG. 11C are diagrams for a control method of preventing an incorrect recognition in case of receiving a photography command using a front surface of a touchscreen 151 according to one embodiment of the present invention.

Referring to FIG. 11A, a user currently grabs the mobile terminal 100 in self-photography mode using a user's hand 1100. Once the user grabs the mobile terminal 100 comfortably, a touch may be applied to a prescribed region of the touchscreen 151.

According to the example shown in the drawing, referring to FIG. 11B, prescribed regions 10*b*, 10*c* and 10*d* of the touchscreen 151 are touched with a middle finger, a ring finger and a little finger of the hand 1100, respectively. According to one embodiment of the present invention, it is proposed that the controller 180 identifies a touch input other than the touch input for the photograph command and then excludes the identified touch input.

Therefore, any functions will not be run in response to a touch input that meets a disregard condition among touch inputs received through the touchscreen 151. One example of the disregard condition may include a condition that a touch is maintained over a prescribed time or a condition that a touch input has been received before entering a self-photography mode.

The controller 180 can perform photography in response to a touch input other than touch inputs corresponding to the disregard conditions.

In particular, referring to FIG. 11C, it is able to control the rear camera 121*b* to take a photo in response to a touch input 10*e*.

According to the embodiment described with reference to FIG. 11A-FIG. 11C, it is apparent that a photo can be taken in response to a touch gesture in combination with the former embodiment described with reference to FIG. 9A and FIG. 9B.

Meanwhile, according to one embodiment of the present invention, since it is unable to check the touchscreen 151 in self-photography mode, it may be difficult to control a subject to be in focus. A control method for compensating such difficulty is described in detail with reference to FIG. 12A-FIG. 12C as follows.

FIG. 12A-FIG. 12C are diagrams for a control method of controlling a focus in self-photography mode according to one embodiment of the present invention.

Referring to FIG. 12A, as a self-photography is entered, an output of a preview screen 301*b* is currently interrupted. If a prescribed touch gesture 10*f* is applied to the touchscreen 151 (FIG. 12B], referring to FIG. 12C, the controller 180 can control a subject to be in focus automatically. Moreover, if the subject gets in focus, it is able to further output a sound effect 1201 to announce that the focus is complete.

Meanwhile, after a photo has been taken in self-photography mode, a control method for facilitating a photography result to be checked is described in detail with reference to FIG. 13A-FIG. 13C and FIG. 14A, FIG. 14B as follows.

FIG. 13A-FIG. 13C are diagrams for a control method of checking a taken photo after taking a photo in self-photography mode according to one embodiment of the present invention.

Referring to FIG. 13A, the controller 180 controls the rear camera 121b to take a photo in response to a photograph command. If a 1$^{st}$ condition is met, the controller 180 can output a preview image 1301 for the taken photo. In this case, the 1$^{st}$ condition may include a condition for a user's intention to check the preview image 1301.

In particular, if the 1$^{st}$ condition is met, referring to FIG. 13B, the controller 180 determines that the user's intention to check the preview image 1301 exists and is then able to output the preview image 1301. In this case, the 1$^{st}$ condition may include a condition that the mobile terminal 100 is rotated over a prescribed range in self-photography mode. In addition, a condition that a face identical to that included in a photo just taken is recognized through the front camera 121a can be further included together with the rotation.

While the preview image 1301 is outputted, if a 2$^{nd}$ condition is met, the controller 180 can output a thumbnail list 1302 of taken photos. In particular, the thumbnail list 1302 may include a thumbnail list of photos taken in self-photography mode or a list of photos in which the face recognized from the outputted preview image 1301 shown in FIG. 13B is included.

The 2$^{nd}$ condition may include a condition related to an intention for a user to check a list of the taken photos. In particular, if the 2$^{nd}$ condition is met, the controller 180 can determine that a user's intention to check a list exists. One example of the 2$^{nd}$ condition may include a condition that a gesture of drawing the mobile terminal 100 toward a user body is received in a state that the user is checking the preview image 1301.

Meanwhile, if a user performs photography plural times in self-photography mode entered, photos taken plural times may be included in the outputted thumbnail list 1302 as shown in FIG. 13C. In this case, according to one embodiment of the present invention, proposed is a control method of facilitating an unnecessary photo to be deleted. This is described in detail with reference to FIG. 14A, FIG. 14B as follows.

Figure 14A:
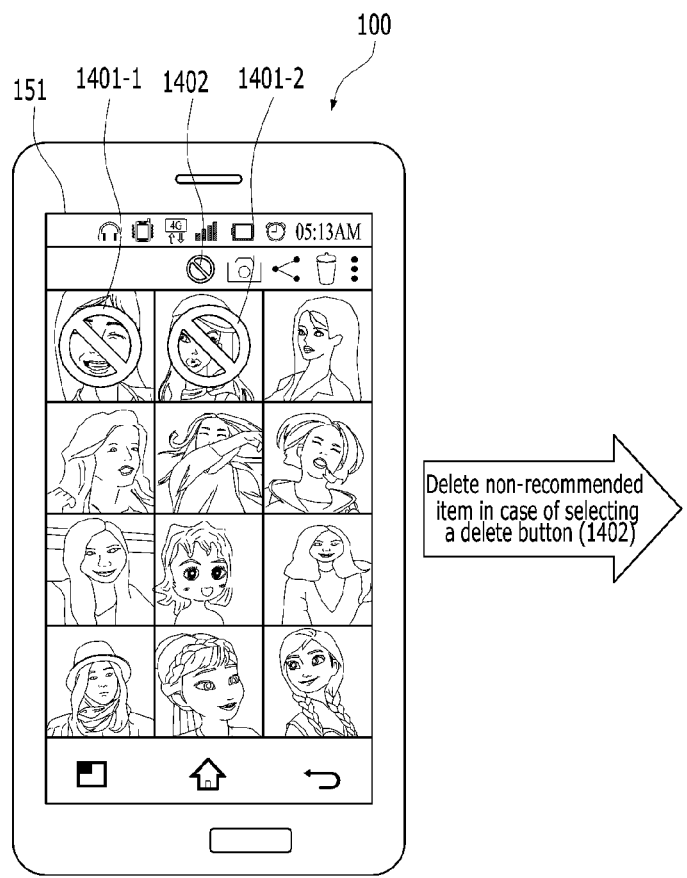
FIG. 14A and FIG. 14B are diagrams for a control method of facilitating a deletion of an unnecessary photo from a thumbnail list of taken photos according to one embodiment of the present invention.
Figure 14B:
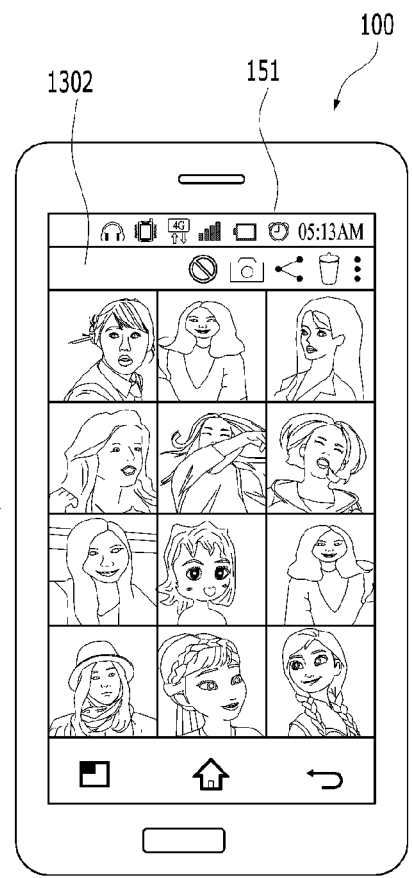

FIG. 14A and FIG. 14B are diagrams for a control method of facilitating a deletion of an unnecessary photo from a thumbnail list of taken photos according to one embodiment of the present invention.

Referring to FIG. 14A, the thumbnail list 1302 mentioned in the above description is currently outputted. According to one embodiment of the present invention, it is determined whether a focus on a taken photo is shaken. If the focus is shaken, the focus-shaken photo is identifiably displayed on the thumbnail list 1302.

Referring to FIG. 14A, the controller 180 outputs a non-recommend indicator 1401-1/1401-2 for an identifiable display of a shaken photo on the thumbnail list 1302. And, the controller 180 can output a delete icon 1402 together with the non-recommend indicators 1401-1 and 1401-2. If an input of selecting the delete icon 1402 is received, the controller 180 can delete the focus-shaken photos collectively.

Meanwhile, while the preview image 1301 or the thumbnail list 1302 is outputted, like FIG. 13A-FIG. 13C, FIG. 14A, and FIG. 14B, a control method for returning to a previous photographing state may be required. Such a control method is described in detail with reference to FIG. 15A and FIG. 15B as follows.

Figure 15A:
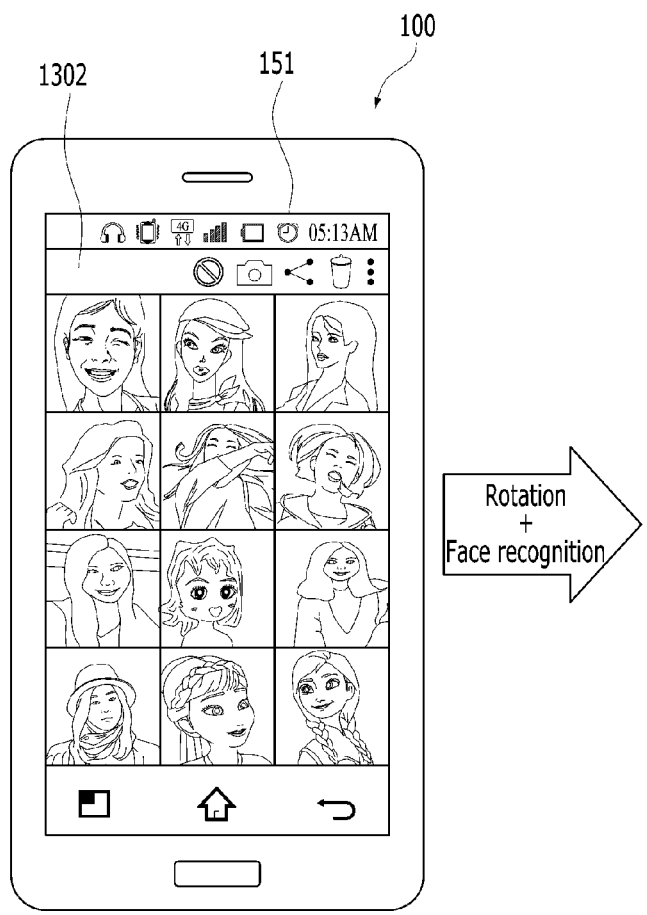
FIG. 15A and FIG. 15B are diagrams for a control method of returning to a previous photography mode in a state for checking a taken photo like a preview image or a thumbnail list according to one embodiment of the present invention.
Figure 15B:
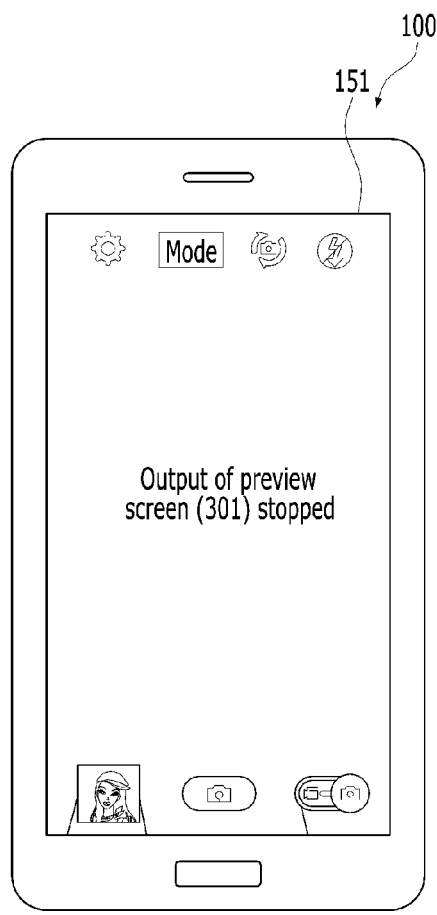

FIG. 15A and FIG. 15B are diagrams for a control method of returning to a previous photography mode in a state for checking a taken photo like a preview image or a thumbnail list according to one embodiment of the present invention.

Referring to FIG. 15A and FIG. 15B, if a prescribed condition is met in a state for checking a photo, the controller 180 may return to a previous photography mode (e.g., self-photography mode in FIG. 15B). In this case, the prescribed condition may include a condition related to a user's intention to re-photograph. For example, the prescribed condition may include a condition that the mobile terminal 100 is rotated over a prescribed angle or a condition that a face is recognized through the rear camera 121b.

Meanwhile, a control method for facilitating a control of a taken photo is required. Such a control method is described in detail with reference to FIG. 16A and FIG. 16B as follows.

Figure 16A:
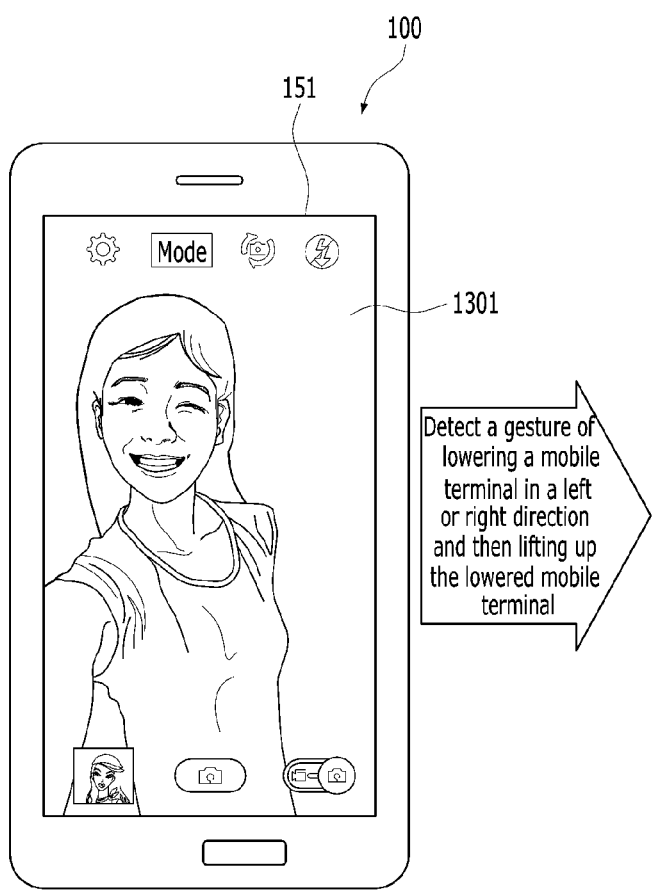
FIG. 16A and FIG. 16B are diagrams for a control method of deleting a taken photo if a prescribed condition is met in the course of viewing a preview image 1301 of the taken photo according to one embodiment of the present invention.
Figure 16B:
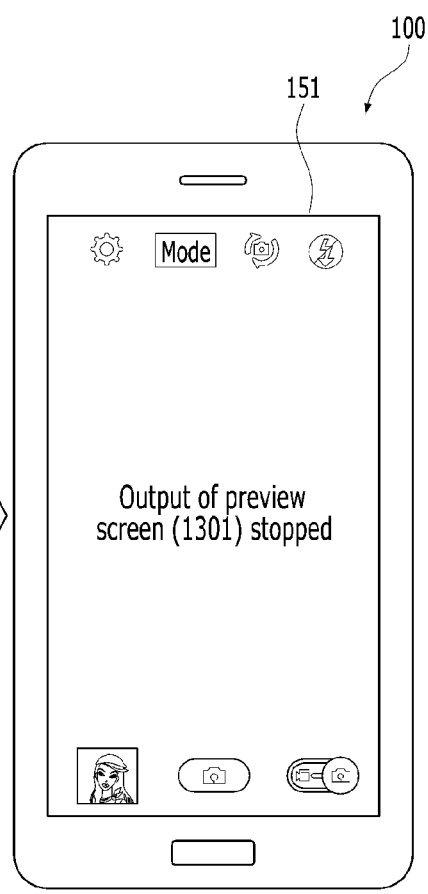

FIG. 16A and FIG. 16B is a diagram for a control method of deleting a taken photo if a prescribed condition is met in the course of viewing a preview image 1301 of the taken photo according to one embodiment of the present invention.

Referring to FIG. 16A, a preview image 1301 for a photo just taken is outputted through the touchscreen 151. While the preview image 1301 is outputted, if a prescribed condition is met, the controller 180 can control the taken photo to be deleted. In this case, the prescribed condition may include a condition related to a user's intention of deletion. For example, the prescribed condition may include a condition that a motion of lowering the mobile terminal 100 in a left or right direction and then lifting up the mobile terminal 100 again is detected. And, it may be able to detect such a motion using a result detected through the sensing unit 140.

In addition, the controller 180 re-enters a previous photography mode as soon as deletes a photo. Namely, if the user does not like the taken photo, it is highly probable that the user may delete the taken photo. Hence, the controller 180 re-enters the photo photography mode as shown in FIG. 16B.

As mentioned in the foregoing description, when the rear camera 121b is used, a user is unable to check a preview screen for a taken photo. According to one embodiment of the present invention mentioned in the following description, a control method for a user to check a preview screen with a mobile terminal 100-2 of a watch type is described.

FIG. 17A and FIG. 17B are diagrams for a control method of checking a preview screen of a rear camera 121b through a touchscreen 1701 of a watch type mobile terminal 100-2 according to one embodiment of the present invention.

According to one embodiment of the present invention related to FIG. 17A, assume that the mobile terminal 100-1 and the watch type mobile terminal 100-2 can exchange data with each other by being connected to each other by a wireless communication technology (e.g., by establishing a session with each other).

Referring to FIG. 17A, a user currently grabs the mobile terminal 100-1 to take a photo through the rear camera 121b provided to a backside of the mobile terminal 100-1. And, the user currently wears the watch type mobile terminal 100-2 on a user's wrist.

While the user wears the watch type mobile terminal 100-2 on the wrist, if the user rotates the watch type mobile terminal 100-2 over a prescribed angle (i.e., a touchscreen 1701 of the watch type mobile terminal 100-2 is rotated toward the user), the controller 180 can transmit a preview screen of the rear camera 121b to the watch type mobile terminal 100-2. Subsequently, the watch type mobile terminal 100-2 receives the preview screen and controls the received preview screen to be outputted to the touchscreen 1701. If so, the user can check the preview screen of the photo, which is taken through the mobile terminal 100-1, through the touchscreen 1701 of the watch type mobile terminal 100-2.

Meanwhile, in case that a plurality of photography modes exist, it may be able to enter each of a plurality of the photography modes using the rotating action.

In particular, if one round is further rotated in the state shown in FIG. 17B, the controller can switch a $1^{st}$ photography mode to a $2^{nd}$ photography mode. Furthermore, if the watch type mobile terminal 100-2 is rotated into an original state (i.e., a state that the touchscreen 1701 faces a direction opposite to the user), the controller 180 can end the photography mode.

Additionally, it is proposed to control the rear camera 121b based on a touch gesture applied to the touchscreen 1701 of the watch type mobile terminal 100-2. In particular, a control of the photography through the mobile terminal 100-1 is performed using the watch type mobile terminal 100-2. One example of such a touch gesture is described in detail with reference to FIG. 18A-FIG. 18F as follows.

FIG. 18A-FIG. 18F are diagrams for one example of a touch gesture applicable to a watch type mobile terminal 300 to control a photography of a mobile terminal 100 according to one embodiment of the present invention.

Figure 18A:
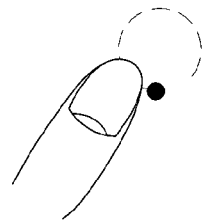
FIG. 18A, FIG. 18B, FIG. 18C, FIG. 18D, FIG. 18E, and FIG. 18F are diagrams for one example of a touch gesture applicable to a watch type mobile terminal 300 to control a photography of a mobile terminal 100 according to one embodiment of the present invention.

FIG. 18A shows a touch drag gesture of drawing a circle clockwise. According to one example of a control method, a zoom-in function can be applied to a preview screen in response to this touch gesture.

Figure 18B:
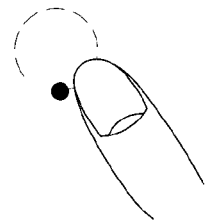

FIG. 18B shows a touch drag gesture of drawing a circle counterclockwise. According to one example of a control method, a zoom-out function can be applied to a preview screen in response to this touch gesture.

Figure 18C:
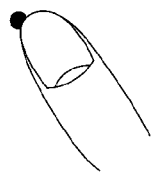

FIG. 18C shows a touch gesture of tapping on the touchscreen 1701. According to one example of a control method, it is able to control the rear camera 121b to take a photo in response to this touch gesture.

Figure 18D:
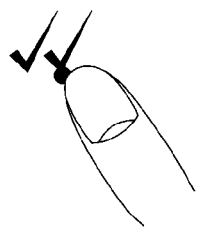

FIG. 18D shows a touch gesture of double tapping on the touchscreen 1701. According to one example of a control method, it is able to control the rear camera 121b to take burst shots in response to this touch gesture.

Figure 18E:
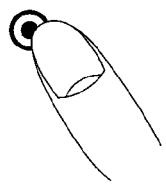
Figure 18F:
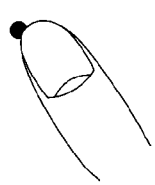

FIG. 18E shows a touch gesture of long touching the touchscreen 1701. According to one example of a control method, it is able to control the rear camera 121b to take a photo after 5 seconds in response to this touch gesture. If the screen is retouched before an elapse of 5 seconds (FIG. 18F), the controller 180 can cancel the photography.

Meanwhile, a control method of taking a photo using a composition set by a user may be required as well as using a gesture of taking a photo. Such an embodiment is described in detail with reference to FIG. 19A-FIG. 19C as follows.

Figure 19C:
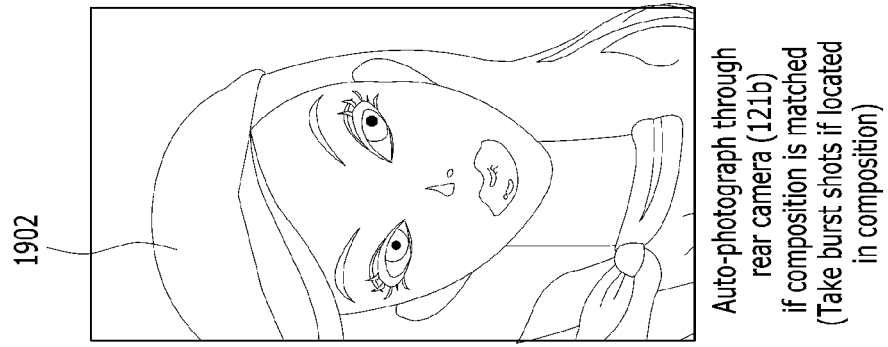
FIG. 19A, FIG. 19B, and FIG. 19C are diagrams for a control method of taking a photo automatically in case of matching a user-set composition according to one embodiment of the present invention.
Figure 19B:
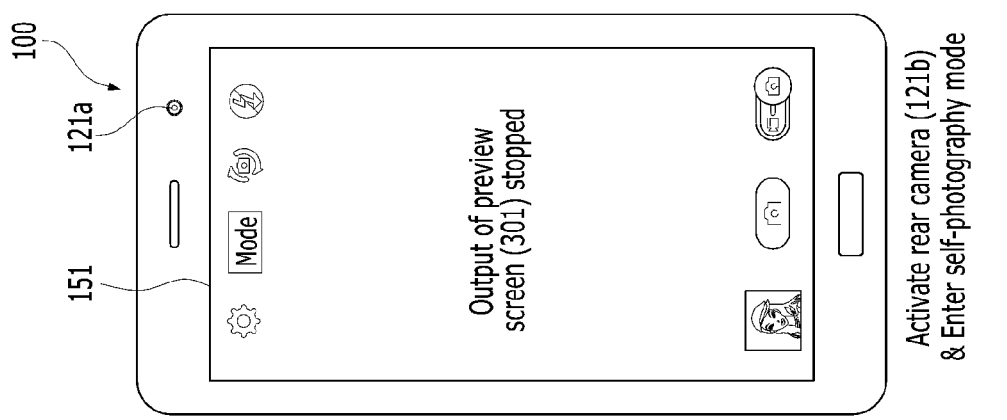
Figure 19A:
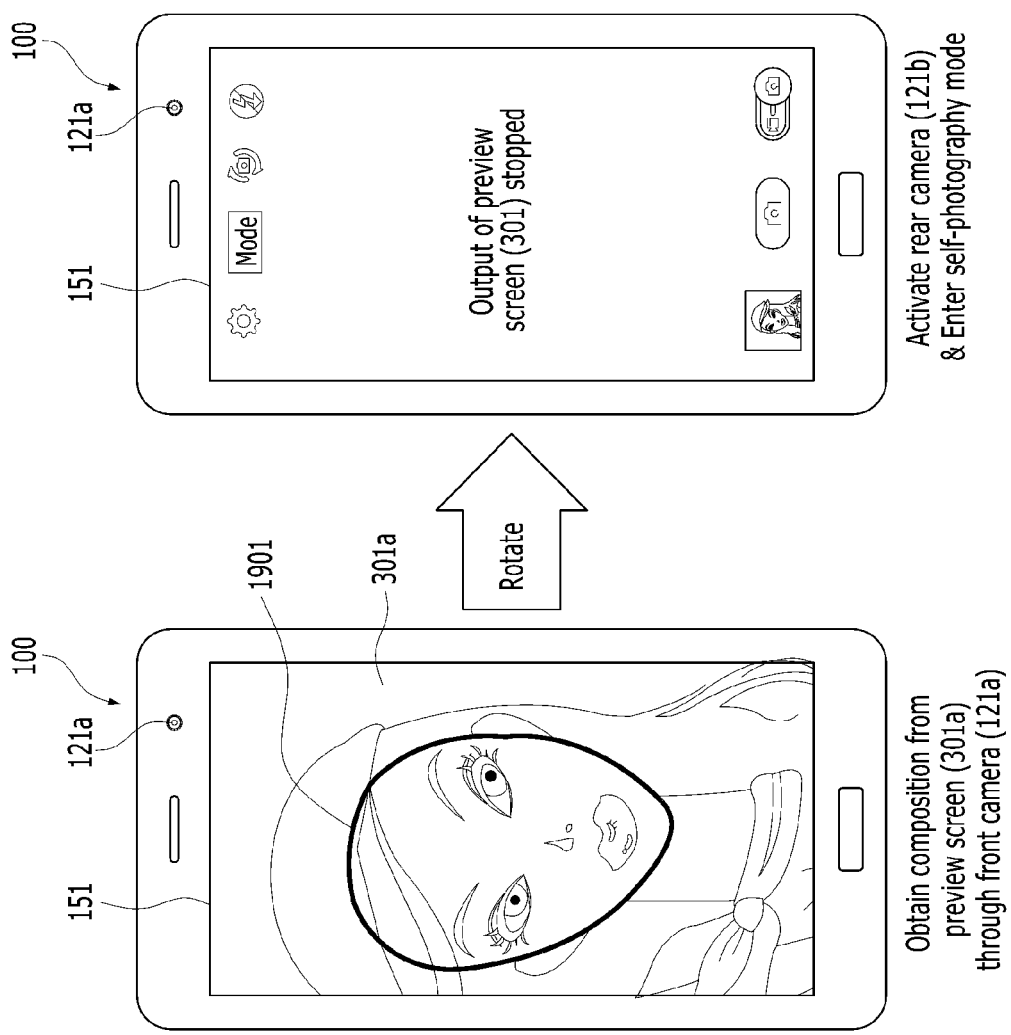

Referring to FIG. 19A, a front preview screen 301a for an image received through the front camera 121a is currently outputted. And, a user is setting a composition on the front preview screen 301a.

As the mobile terminal 100 is rotated, referring to FIG. 19B, a self-photography mode is entered (and the preview screen 301a and 301b stops being outputted).

Referring to FIG. 19C, an image 1902 received through the rear camera 121b is illustrated. As mentioned in the foregoing description of the self-photography mode, the image 1902 may not be outputted as a preview screen through the touchscreen 151.

If the same composition as set in FIG. 19A is detected from the image 1902, the controller 180 can automatically take a photo (without receiving a photograph command from a user).

Moreover, according to one embodiment of the present invention, the controller 180 can take burst shots while the same composition as set is detected.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
   a first camera located on a rear side of the mobile terminal;
   a touchscreen located on a front side of the mobile terminal; and
   a controller configured to:
      activate the first camera;
      cause the touchscreen to display a preview screen for the activated first camera;
      cause the touchscreen to stop the displaying of the preview screen when a self-photography condition is satisfied while the first camera is activated and while the preview screen is displayed;
      cause the first camera to capture a first image in a self-photography mode in response to a touch input received via the touchscreen, the touch input received while the displaying of the preview screen has been stopped and while the self-photography condition has been satisfied, the first image captured after a prescribed time elapses from a timing point of the reception of the touch input; and
      cause output of count sound comprising a countdown from the timing point of the reception of the touch input to a timing point of capturing the first image,
      wherein the first image is captured when the touch input corresponds to a preset touch gesture recognized by the controller such that not all touch inputs received via the touchscreen cause the first camera to capture the first image.

2. The mobile terminal of claim 1, further comprising a second camera located on the front side of the mobile terminal, wherein the self-photography condition is satisfied when a face first recognized in a second image received via the second camera is detected in the first image received via the activated first camera.

3. The mobile terminal of claim 1, further comprising a sensor configured to sense rotation of the mobile terminal, wherein the self-photography condition is satisfied when an angle of the rotation, which is sensed while the first camera is activated, is equal to or greater than a threshold angle.

4. The mobile terminal of claim 1, wherein the self-photography condition is satisfied when a face corresponding to a pre-stored face is detected in the first image received via the first camera.

5. The mobile terminal of claim 1, wherein the controller is further configured to:
cause the touchscreen to display a shutter button on the preview screen.

6. The mobile terminal of claim 5, wherein:
the touch input is received at a location of the touchscreen other than where the shutter button is displayed.

7. The mobile terminal of claim 1, further comprising a sensor configured to sense rotation of the mobile terminal, wherein the controller is further configured to:
cause the first camera to capture the first image in response to a shutter command; and
cause the touchscreen to display a preview list of images captured via the first camera in response to the rotation of the mobile terminal sensed after the first image is captured, the preview list including the first image.

8. The mobile terminal of claim 1, further comprising a sensor configured to sense rotation and movement of the mobile terminal, wherein the controller is further configured to:
cause the first camera to capture the first image in response to a shutter command;
cause the touchscreen to display the first image in response to the rotation of the mobile terminal sensed after the first image is captured; and
cause the touchscreen to display a preview list of images including the first image in response to the movement of the mobile terminal in a specific direction sensed while the first image is displayed on the touchscreen.

9. The mobile terminal of claim 1, wherein the controller is further configured to:
recognize a face of a user in the first image received via the first camera; and
cause the first camera to take burst shots while a composition of the recognized face corresponds to a preset composition.

10. The mobile terminal of claim 1, wherein the controller is further configured to cause the touchscreen to display a preset image in the self-photography mode and when the displaying of the preview screen is stopped.

11. A method for controlling a mobile terminal having a first camera on a rear side of the mobile terminal, the method comprising:
activating the first camera;
displaying a preview screen for the activated first camera on a touchscreen located on a front side of the mobile terminal;
stopping the displaying of the preview screen when a self-photography condition is satisfied while the first camera is activated and while the preview screen is displayed;
capturing a first image via the first camera in a self-photography mode in response to a touch input received via the touchscreen, the touch input received while the displaying of the preview screen has been stopped and while the self-photography condition has been satisfied, the first image captured after a prescribed time elapses from a timing point of the reception of the touch input; and
outputting count sound comprising a countdown from the timing point of the reception of the touch input to a timing point of capturing the first image,
wherein the first image is captured when the touch input is recognized as a preset touch gesture such that not all touch inputs received via the touchscreen cause the first camera to capture the first image.

12. The method of claim 11, wherein:
the mobile terminal further comprises a second camera located on the front side of the mobile terminal; and
the self-photography condition is satisfied when a face first recognized in a second image received via the second camera is detected in the first image received via the activated first camera.

13. The method of claim 11, wherein:
the mobile terminal further comprises a sensor configured to sense rotation of the mobile terminal; and
the self-photography condition is satisfied when an angle of the rotation, which is sensed while the first camera is activated, is equal to or greater than a threshold angle.

14. The method of claim 11, wherein the self-photography condition is satisfied when a face corresponding to a pre-stored face is detected in the first image received via the first camera.

15. The method of claim 11, further comprising:
displaying a shutter button on the preview screen.

16. The method of claim 15, wherein:
the touch input is received at a location of the touchscreen other than where the shutter button is displayed.

17. The method of claim 11, further comprising:
sensing rotation of the mobile terminal via a sensor;
capturing the first image via the first camera in response to a shutter command; and
displaying a preview list of images captured via the first camera in response to the rotation of the mobile terminal sensed after the first image is captured, the preview list including the first image.

18. The method of claim 11, further comprising:
sensing rotation and movement of the mobile terminal via a sensor;
capturing the first image via the first camera in response to a shutter command;
displaying the first image in response to the rotation of the mobile terminal sensed after the first image is captured; and
displaying a preview list of images including the first image in response to the movement of the mobile terminal in a specific direction sensed while the first image is displayed on the touchscreen.

19. The method of claim 11, further comprising:
recognizing a face of a user in the first image received via the first camera; and taking burst shots via the first camera while a composition of the recognized face corresponds to a preset composition.

20. The method of claim 11, further comprising displaying a preset image in the self-photography mode and when the displaying of the preview screen is stopped.

\* \* \* \* \*